(12) United States Patent
Onno et al.

(10) Patent No.: US 12,177,085 B2
(45) Date of Patent: Dec. 24, 2024

(54) METHOD FOR ANALYTICS DATA RETRIEVAL AND CORRESPONDING APPARATUS

(71) Applicant: InterDigital CE Intermediate, SAS, Paris (FR)

(72) Inventors: Stephane Onno, Saint Gregoire (FR); Christopher Howson, Corps-Nuds (FR); Christoph Neumann, Rennes (FR); Francois Schnitzler, Saint Ave (FR)

(73) Assignee: INTERDIGITAL CE INTERMEDIATE, SAS, Paris (FR)

( * ) Notice: Subject to any disclaimer, the term of this patent is extended or adjusted under 35 U.S.C. 154(b) by 0 days.

(21) Appl. No.: 18/277,332

(22) PCT Filed: Feb. 14, 2022

(86) PCT No.: PCT/EP2022/053453
§ 371 (c)(1),
(2) Date: Aug. 15, 2023

(87) PCT Pub. No.: WO2022/175188
PCT Pub. Date: Aug. 25, 2022

(65) Prior Publication Data
US 2024/0137282 A1 Apr. 25, 2024
US 2024/0235947 A9 Jul. 11, 2024

(30) Foreign Application Priority Data
Feb. 16, 2021 (EP) .................................... 21305194
May 7, 2021 (EP) .................................... 21305596

(51) Int. Cl.
*H04L 41/142* (2022.01)
*H04L 41/50* (2022.01)

(52) U.S. Cl.
CPC ........ *H04L 41/142* (2013.01); *H04L 41/5058* (2013.01)

(58) Field of Classification Search
CPC .......................... H04L 41/142; H04L 41/5058
(Continued)

(56) References Cited

U.S. PATENT DOCUMENTS

2020/0228420 A1\* 7/2020 Dao ....................... H04L 41/142
2021/0026986 A1\* 1/2021 Woessner ............ G06F 21/6263
(Continued)

FOREIGN PATENT DOCUMENTS

WO   WO 2020070118 A1   4/2020
WO   WO 2021004859 A1   1/2021

OTHER PUBLICATIONS

3rd Generation Partnership Project; Technical Specification Group Services and System Aspects; Architecture enhancements for 5G System (5GS) to support network data analytics services (Release 16), 3GPP Ts 23.288 V16.6.0, Dec. 2020, 67 pages.
(Continued)

*Primary Examiner* — Ruolei Zong
(74) *Attorney, Agent, or Firm* — VOLPE KOENIG

(57) ABSTRACT

A first network analysis node in a network receives, from a device, a first message comprising information indicative of a subscription, for the device, to network analytics information, and sends, to a second network node, a second message comprising information indicative of a request for a transfer of at least part of the subscription to network analytics information to a second network analysis node.

8 Claims, 20 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2021/0314795 A1* | 10/2021 | Li | H04W 28/0231 |
| 2021/0351993 A1* | 11/2021 | Puente Pestaña | H04L 41/046 |
| 2022/0053393 A1* | 2/2022 | Khare | H04W 36/0055 |
| 2022/0303344 A1* | 9/2022 | Sayko | G06F 16/9566 |

OTHER PUBLICATIONS

"3rd Generation Partnership Project; Technical Specification Group Services and System Aspects; Study on enablers for network automation for the 5G System (SGS); Phase 2 (Release 17)", 3GPP TR 23.700-91 V17.0.0, Dec. 2020, 382 pages.

Interdigital, "Addition of sets of NWDAF identifiers involved in analytics aggregation", 3rd Generation Partnership Project; 3GPP TSG-WG SA2 Meeting #145E e-meeting, 3 PP Draft S2-2104020, May 17-28, 2021, 11 pages.

Interdigital, "Extension of Nnwdaf_AnalyticsSubscription_Transfer service operation for partial transfer", 3rd Generation Partnership Project; 3GPP TSG-WG SA2 Meeting #145E e-meeting, 3 PP Draft S2-2104021, May 17-28, 2021, 3 pages.

* cited by examiner

METHOD FOR ANALYTICS DATA RETRIEVAL AND CORRESPONDING APPARATUS

This application is a U.S. National Stage Application under 35 U.S.C. § 371 of International Patent Application No. PCT/EP2022/053453, filed Feb. 14, 2022, which is incorporated herein by reference in its entirety.

This application claims priority to European Application Nos. (i) 21305194.9, filed Feb. 16, 2021, and (ii) 21305596.5, filed May 7, 2021, each of which is incorporated herein by reference in its entirety.

FIELD

The present disclosure generally relates to the field of analytics data retrieval in a network and in particular to retrieval of analytics data for the purpose of improving the network's efficiency and performance.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

In various types of networked environments (e.g., Software Defined Network (SDN)-based, 5G networks, Autonomous Systems (AS)) dedicated analytics functions are used to provide access to analytics services for providing statistical information related to data and metrics of the past, or predictive information of data and metrics for the future. Such analytics functions allow to improve network efficiency and performance, and network functions can request or subscribe to retrieval of analytics data from these dedicated analytics functions. In 5G networks for example, data analytics may be used to enhance network management, traffic engineering, radio access selection, and traffic steering.

In the 3GPP ($3^{rd}$ Generation Partnership Project), a Network Data Analytics Function (NWDAF) is responsible for providing network analysis information upon request from network functions. For example, a network function may request specific analysis information on the load level of a particular network slice. Alternatively, the network function can use a subscribe service to ensure that it is notified by the NWDAF if the load level of a network slice changes or reaches a specific threshold. The NWDAF may be based on data provided by Network Functions (NF), for example, Access & Mobility Function (AMF), Session Management Function (SMF), Policy Control Function (PCF), User Data Management (UDM), or Application Function (AF) (directly or via Network Exposure Function (NEF)), or by Operations & Maintenance (OAM). These analytics services can be used by 5G Network Functions and OAM to improve network performance.

A single instance or multiple instances of an analytics function may be deployed in a network. When multiple analytics functions exist, not all of them need to be able to provide the same type of analytics results.

In order to access and query the analytics function, a data analytics consumer may request from or register to the analytics function according to a variable set of input parameters. Such input parameters allow to express a wide range of queries and allow to target specific data and information collected by the analytics service, and the queries using that kind of input parameters are commonly referred to as 'rich' queries.

A NWDAF may support rich queries. However, when there are multiple analytics functions deployed in a network, the analytics data consumer itself must discover, or identify, the analytics function, or the set of functions, that may answer a given rich query. Furthermore, it may be useful, e.g., for reasons such as User Equipment (UE) mobility, data migration, capability updates of an analytics function, or load balancing, to dynamically migrate an ongoing rich-query (or a subset of this rich query) from one analytics function to one (or several) other analytics functions. While handover mechanisms exist, these are done at a coarse level.

Improvement for support of rich queries is therefore desirable.

SUMMARY

In a first aspect, the present principles are directed to a method performed by a first network analysis node in a network, the method comprising receiving, from a device, a first message comprising information indicative of a subscription, for the device, to network analytics information, and sending, to a second network node, a second message comprising information indicative of a request for a transfer of at least part of the subscription to network analytics information to a second network analysis node.

In a second aspect, the present principles are directed to a first network analysis node, comprising memory storing processor-executable program instructions and at least one processor configured to execute the program instructions to receive, from a device in a network, a first message comprising information indicative of a subscription, for the device, to network analytics information, and send, to a second network node in the network, a second message comprising information indicative of a request for a transfer of at least part of the subscription to network analytics information to a second network analysis node.

BRIEF DESCRIPTION OF THE DRAWINGS

Advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1A:
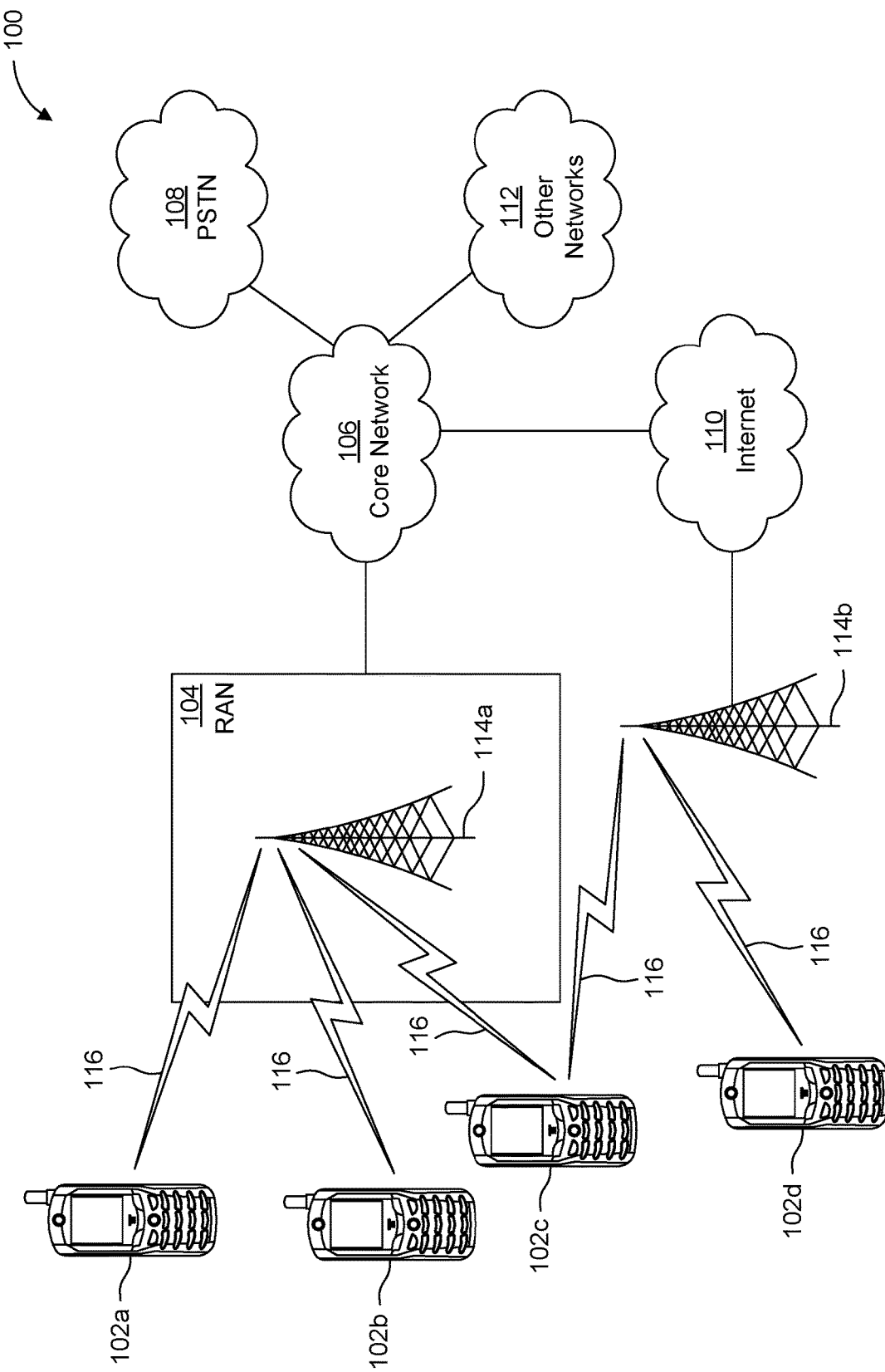
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a analytics data consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
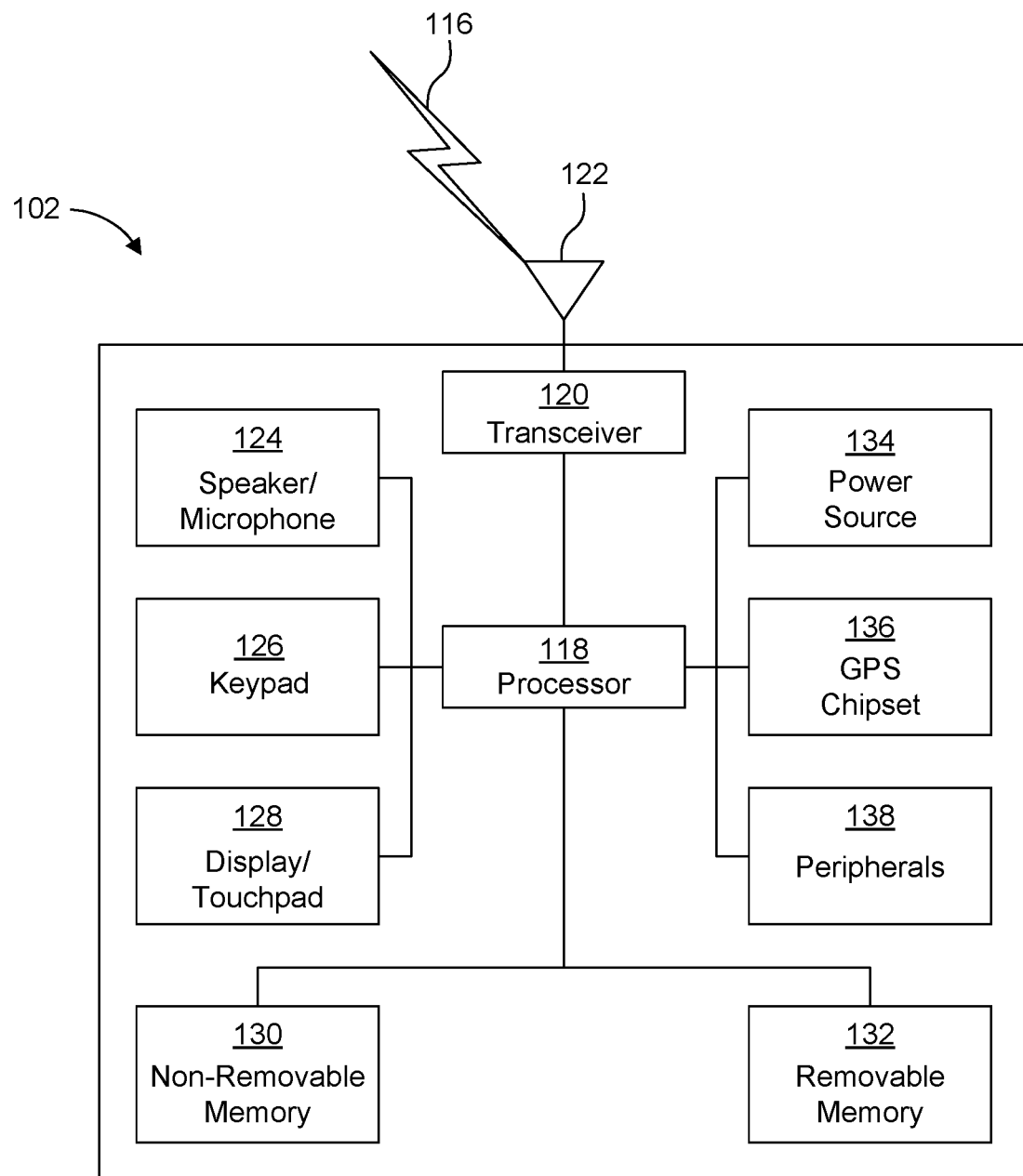
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
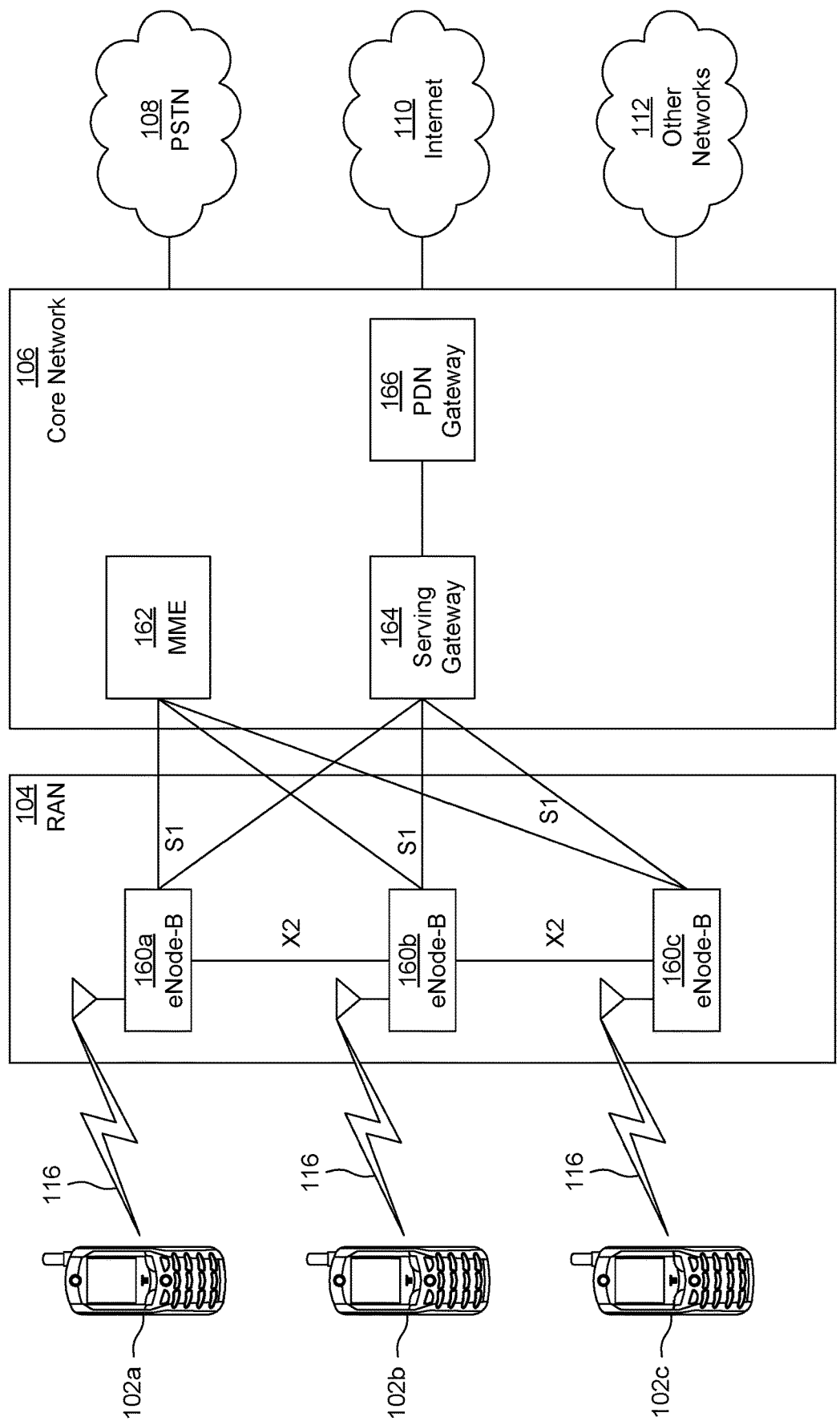
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
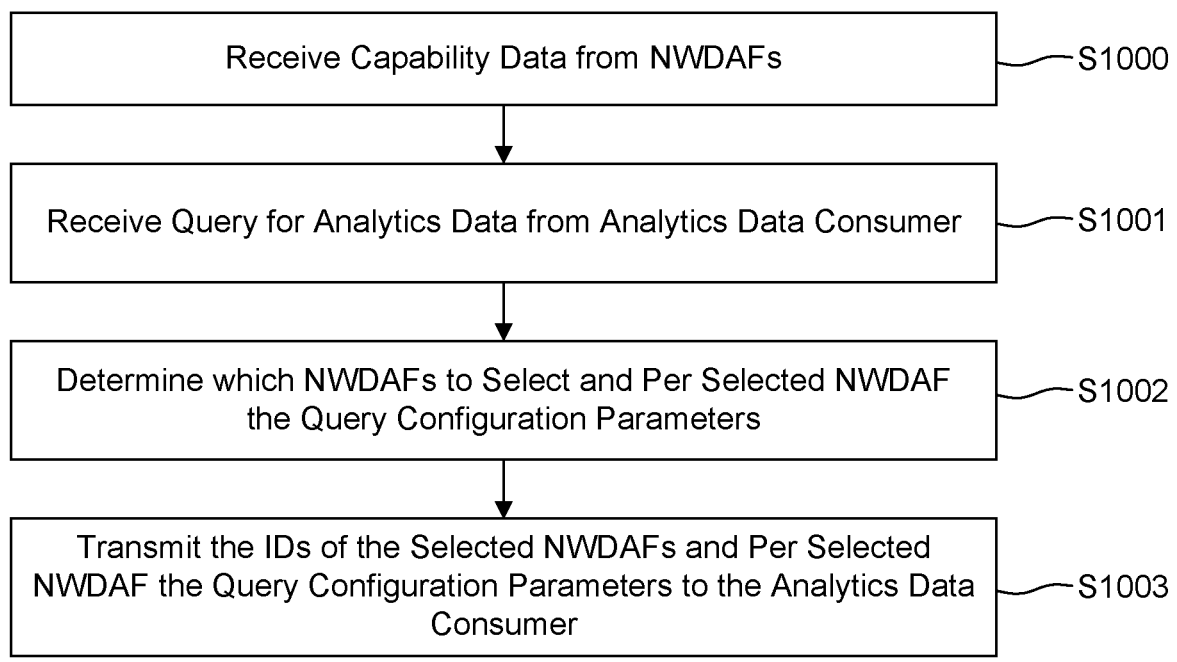
FIG. 10 is a flow chart illustrating an embodiment of a method for analytics data retrieval.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
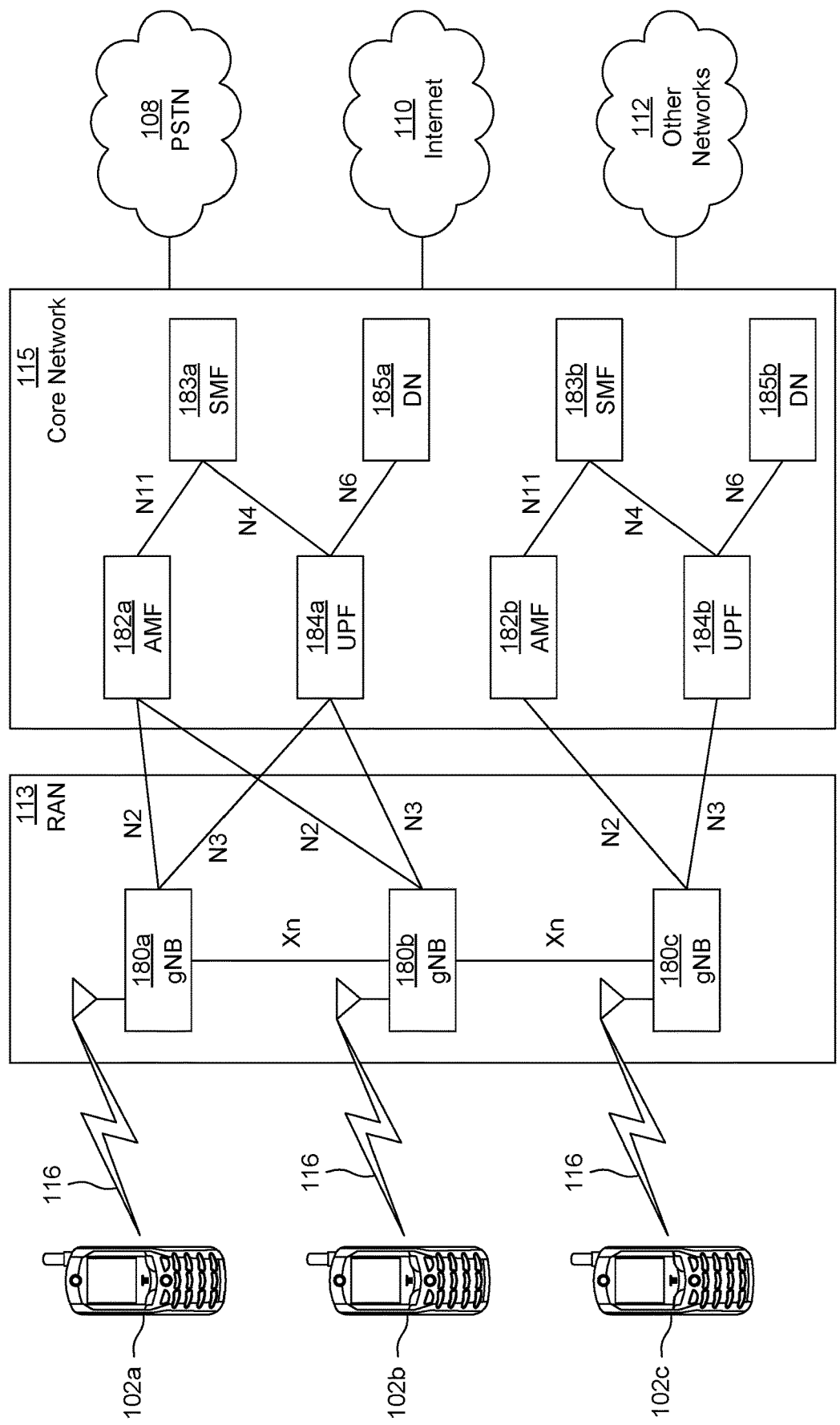
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

In order to access and query the analytics function, an analytics data consumer may request from, or register to, the analytics function according to a variable set of input parameters. Such input parameters allow to express a wide range of queries and allow to target specific data and information collected by the analytics service. Examples of the type of parameters that may be supported are:
  identification of the type of analytics e.g., Analytics ID for 3GPP observed service experience;
  filter information, e.g., Application ID;
  duration that data is kept in the analytics function;
  time window;
  spatial validity; and
  validity period (time period for which a prediction is valid).

In 3GPP, the NWDAF may support rich queries, similar to the one discussed. When there are multiple analytics functions deployed in a network, the following functionalities may be supported.

Discovery and selection: before contacting a given analytics function, the analytics data consumer may discover, i.e., identify, the analytics function or the set of functions that may answer a given rich query. While discovery mechanisms may for example be provided by a Network Repository Function (NRF) these mechanisms may, in certain embodiments, only provide coarse discovery, i.e., it may not be possible to identify precisely the correct analytics services to select for a rich query.

Support for handover and reselection: there are several reasons (e.g., UE mobility, data migration, and load balancing) that may require to dynamically migrate an ongoing rich query (or a subset of this rich query) from one analytics function to one (or several) other analytics functions. Handover mechanisms are done at a coarse level and do not allow to decompose (split) and therefore optimize the rich query handover.

Discovery and selection, as well as support for handover and reselection is discussed in the following sections.

Discovery and Selection Within a service-based architecture (e.g., such as according to 3GPP), each given function may be split into a set of instances serving whole or parts of the services. For analytics services, a particular function may serve a subset range or list of different input parameters as described previously. For example, one function may store data older than one day and one function per NF can store recent data. A particular analytics function may also be instantiated several times.

An analytics data consumer (i.e., the analytics data consumer is a NF—such as the UPF, PCF, SMF, AMF, AF— running in the core network, in a device, or in a set of devices; e.g., a WTRU, or a network gateway or a gNB) wishing to get an analytics report based on its own set of input parameter range or list, would need to send a request to all (or a very large number of) analytics function instances to retrieve a complete set of analytics reports.

A straightforward solution for an analytics data consumer is to send a set of requests to all (or a very large number of) analytics function instances and process the responses. This will imply handling responses from some analytics function instances having/returning no analytics data and dropping duplicate information from other instances. This creates signaling overhead due to the analytics data consumer being required to transmit service requests to an important number of analytics function instances that are known to the analytics data consumer device in the hope of retrieving the requested data. Consequently, the analytics data consumer may need to remove unnecessary data (e.g., the duplicate data) resulting in an additional computational burden for the analytics data consumer. The combination of the two latter issues (signaling overhead in the network and computational burden for the analytics data consumer) may increase latency to obtain the analytics report.

Implementations based on service directories to identify and find a set of analytics functions for a given request (e.g., using the NRF as a directory of NWDAFs), may return large sets of analytics services functions, more than needed to answer the rich query, as rich queries are not supported by service directories. At the discovery/directory service (e.g., the NRF), there are no means to filter and identify properly the correct analytics function (e.g., an NWDAF instance) given a rich query. This therefore results in the analytics data consumer sending a set of requests to a large number of analytics function instances, retrieving the responses, and processing to remove responses without analytics data and to drop duplicate information from others.

Therefore, the following questions may arise. How may analytics data consumers know which analytics function instances to invoke for the completeness of the service request or subscription that is based on rich queries? How may analytics function instances provide service information capabilities they can serve to analytics data consumers? These questions are applicable to generic frameworks that involve analytics function instances and analytics data consumers, and is also in particular applicable within the context of 3GPP, where the NWDAF acts as an analytics function instance, and where the NRF acts as a (central) service directory function (CDS).

Support for Handover and Reselection

There are several reasons and events that may require ongoing analytics subscriptions to relocate or change an analytics service function. N.B.: the term "ongoing analytics" relates here to, for instance, a request or a subscription from an analytics data consumer to an analytics function instance where the analytics data consumer is still awaiting responses (e.g., analytics results of the request or analytics result updates to the subscription). For example (the following enumeration is non-exhaustive).

The collected analytics data evolves as new fresh analytics data arrives or as new type of analytics data is being collected. The new analytics data collection points may be stored at different analytics functions.

Analytics data consumers may be interested in the freshest data or rather in 'old' data and the responsible analytics function instance may change over time. With regard to the term 'responsible,' each analytics function may be responsible for a given set of data. There are many ways to distribute and split the responsibility, for example by geographical area, by UE IDs, and by time. The definition of this data distribution/responsibility may be managed via configuration, typically by the network operator. There are many reasons to change analytics functions data distribution/responsibility, e.g., load, available storage, network optimization (e.g., minimization of response times), maintenance operation of analytics functions, addition and removal of new analytics functions.

Mobile networks handle data coming from mobile UEs, changing location over time. This may imply, for example if an analytics function instance is responsible for a given geographic area, that an analytics data consumer may want to switch to another analytics function instance in order to get the latest data related to a given UE. In the simplest case the analytics data consumer instance remains the same, but it is also possible that the analytics data consumer instance changes due to UE mobility, e.g., if it is an AMF. AMFs are often responsible of a given TAI (Tracking Area Identity)/geographical area. Therefore, the AMF may change when the UE changes location.

The capacity, in terms of storage or computational resources, of an analytics function instance may be limited, requiring therefore load balancing which implies to offload part of the analytics function(s) performed by the analytics function instance somewhere else.

The analytics data consumer (e.g., one or more NFs) may be relocated for load balancing issues.

The analytics data consumer (e.g., one or more NFs in a mobile datacenter or a UE) may itself be mobile.

The above reasons and events may require that only a subset of the analytics function is transferred (migrated) (e.g., a subset of the data, a subset of the analytics data provision capabilities) and not the entire analytics function. Still, it is desirable that analytics data consumers discover and retrieve the correct analytics function(s) and data after a relocation event. In particular, it is desirable that an ongoing rich query (e.g., based on individual requests or a subscription) towards a set of analytics functions is not interrupted or (partially) aborted for any of the above reasons and events and that the ongoing rich query continues to be served.

Embodiments described here therefore provide transfer of subsets of analytics functions in addition to transfer of entire analytics functions.

1.1 Service Discovery and Selection

Methods are provided for mediating requests or subscriptions from an analytics data consumer destined to analytics function instances. This is realized, according to embodiments, through rich and dynamic mapping between analytics function capabilities of individual analytics function instances with respect to analytics data consumer requests or subscriptions. The mapping may depend on the set of parameters of an analytics data consumer request or subscription, and evaluation of these parameters ('input parameters') against the capabilities of the individual analytics function instance, expressed as another set (or range) of (possible valid) input (query or serving) parameters provided by the analytics function instance during its registration to a service directory (CDS). In an embodiment related to 3GPP, these capabilities are included in the NwdafInfo data structure, the embodiment thereby enriching the NWDAF profile registered with the NRF.

According to embodiments, a Central Directory Service (CDS) computes mappings between analytics functions and analytics data consumers for the purpose of the discussed mediating methods. This mapping may be based on registration of instance capabilities and subsequent updates; and analytics data consumer request/subscription parameters and further updates.

According to an embodiment, a mapping entry index is provided, identified by a unique discovery request/subscription identifier that refers to a list of mapping values. Each mapping value element may comprise an analytics function instance identifier and its partial set of input parameters range for which the analytics function instance provides data analytics.

According to embodiments, after receiving a first/update mapping entry from the CDS, each analytics data consumer may subscribe to each analytics function instance belonging to the list above with request parameters corresponding to the partial set of input parameters. The mapping entry may indicate which part of the request/subscription is fulfilled and which part is not fulfilled.

1.2 Handover and Reselection

According to embodiments, the described CDS service managing the mapping entries provides analytics function handover and reselection. When the CDS receives analytics capabilities updates, it computes the mapping entry table, finds relevant mapping entry values impacted by the service update and may notify, according to an embodiment, an updated discovery answer/notification including a mapping entry update to the analytics data consumer.

This embodiment may be further optimized to reduce the amount of network traffic. Indeed, the CDS has no knowledge about whether the analytics data consumer consumes whole or part of the proposed analytics requests/subscriptions included within mapping entry values. As a result, the CDS may keep unused mapping entries in memory and may expend computational power to provide updates to analytics data consumers which updates are not used by the analytics data consumers for example. According to an embodiment, the CDS tracks (binds) the CDS services the analytics data consumer consumes with regard to the CDS services that the analytics data consumer previously discovered. Therefore, a subset of mapping entry values may be acknowledged directly by the analytics data consumer or indirectly via individual analytics functions, to the CDS. Upon service handovers and reselection, a CDS receiving analytics function capabilities updates may, in some embodiments, only process acknowledged mapping entries to further notify related and useful mapping entries update to the analytics data consumer. This can increase the CDS efficiency and avoid further network traffic to the analytics data consumer.

According to a further embodiment, the analytics data consumer may request/subscribe for a transparent mode to the CDS. This allows the CDS to directly update the subscription to analytics functions on behalf of the analytics data consumer. This may require at least one tracking (binding) embodiment above. When handovers and reselection occur from a new analytics function, the update may include new possible analytics function subscriptions.

According to a further embodiment, the analytics data consumer may provide, to each analytics function the analytics data consumer selected to serve a query, a list of analytics functions that the analytics data consumer did or will select and that will serve the query. Further, when an analytics function involved in the query changes its capabilities such that a partial transfer of the subscription is required, the analytics function queries the CDS to get a new list of analytics functions that may serve the query related to the partial transfer. The list of analytics functions may also be useful and applicable in the case of a full subscription transfer (i.e., not a partial transfer) from one NWDAF to another. Based on the list of analytics functions currently serving the query, the analytics function will preferably select analytics functions that the analytics data consumer initially selected. The analytics function sends a partial transfer request to the selected analytics function and also provides the updated list of the analytics functions that serve the analytics data consumer.

2 Service Discovery and Selection Overview

Figure 2A:
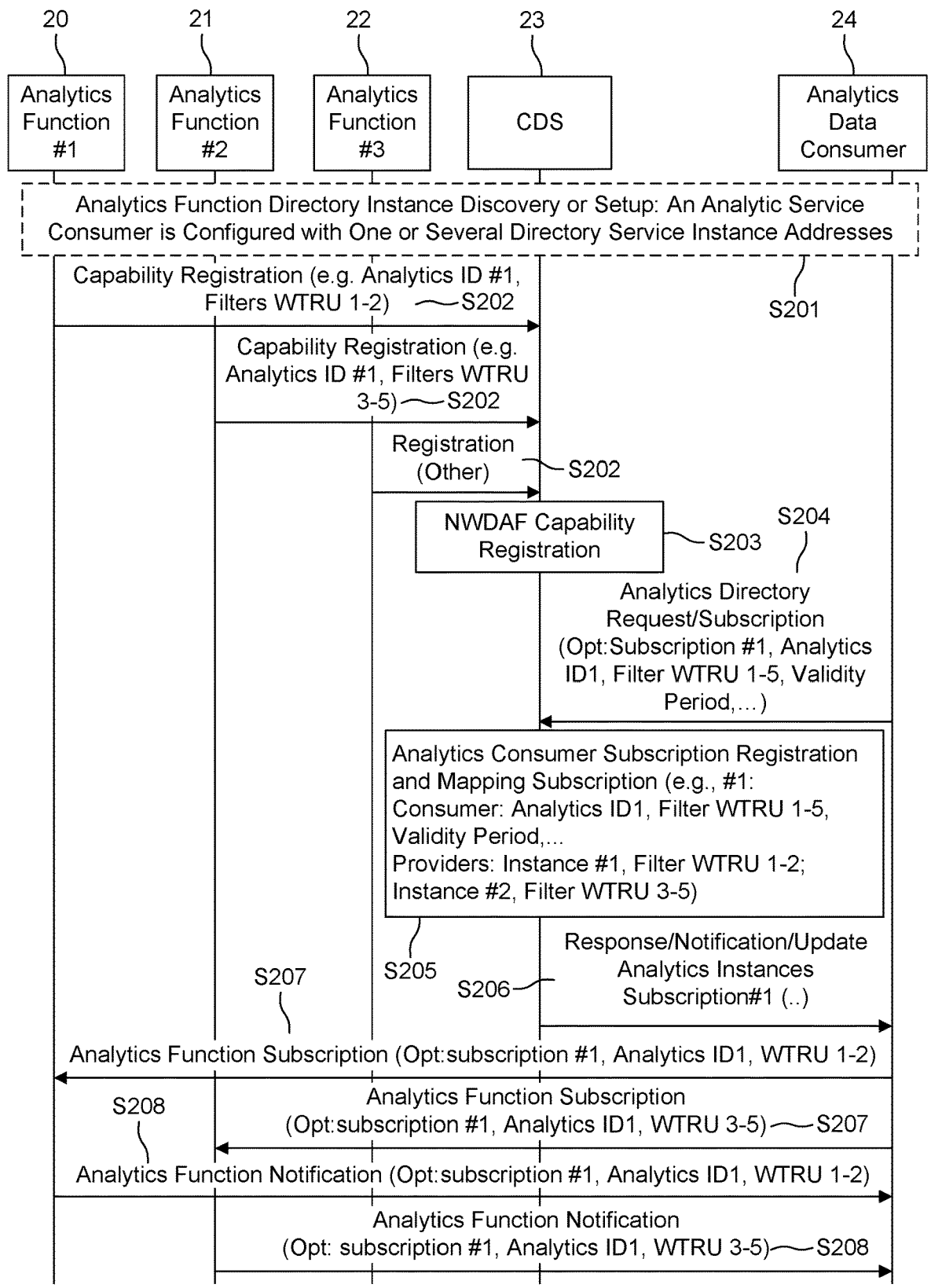
FIGS. 2A-2B are a sequence diagram illustrating an embodiment of a centralized mapping-based method for analytics service directory.
Figure 2B:
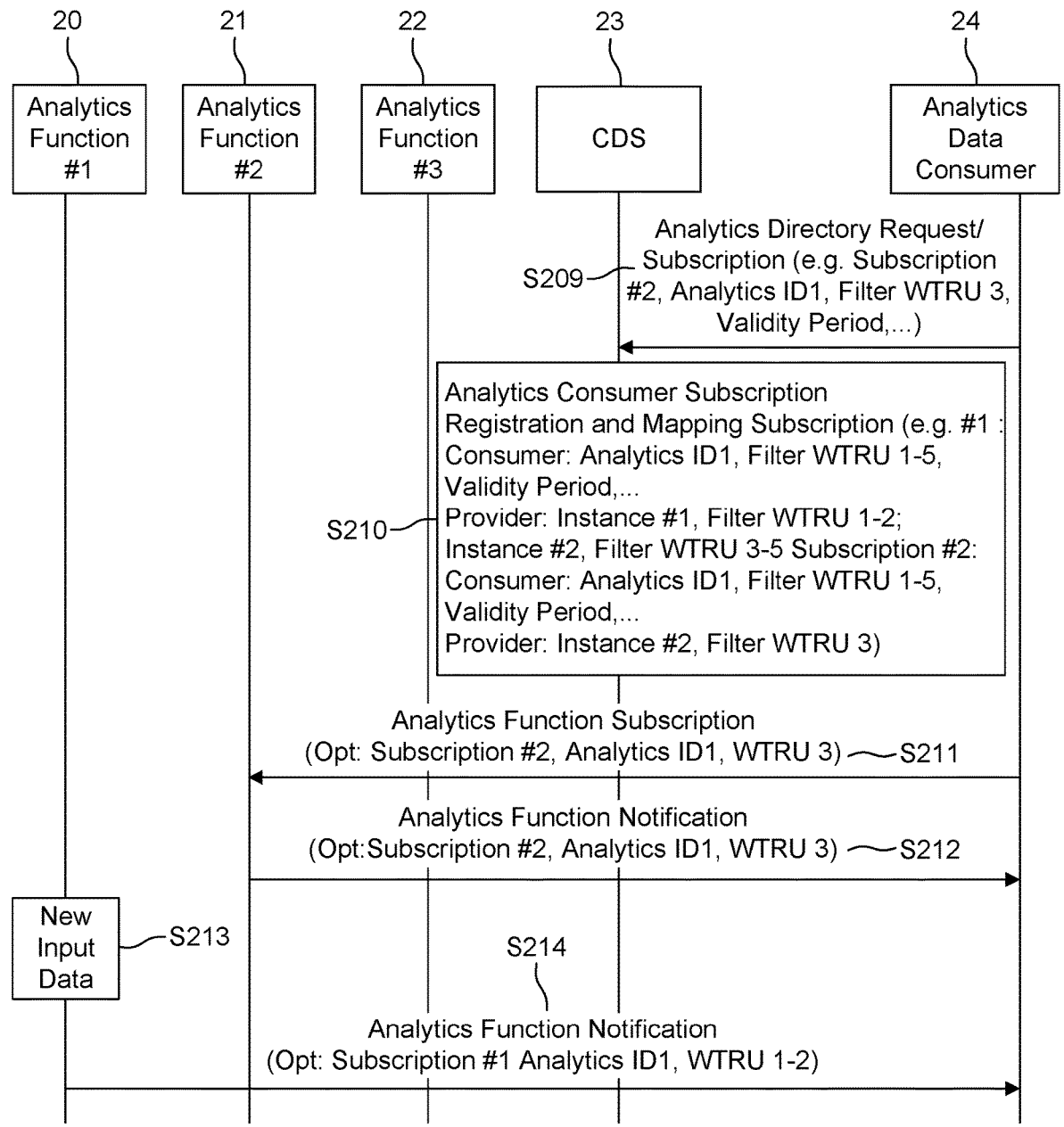

2.1 Centralized Mapping for Providing Fine-Grained Analytics Function Discovery FIGS. 2A-2B is a sequence diagram illustrating an embodiment of a centralized mapping-based method for analytics service directory. From left to right are shown Analytics Function #1 20, Analytics Function #2 21, Analytics Function #3 22, a service directory, CDS, 23 and an Analytics data consumer 24.

In step S201, each of the analytics data consumers (here, only analytics data consumer 24) is configured with one or several assigned CDS instance addresses (in occurrence, the address of CDS 23).

In step S202, capability registrations are performed, wherein the analytics functions 20-22 individually register the analytics functions they provide. The details of the information contained in this registration message is provided further on in this description. According to an embodiment, this message transports a rich NwdafInfo data structure (detailed in a further section) describing the capabilities of the NWDAF.

In step S203, the CDS 23 registers the individual capabilities, e.g., by storing these (in RAM or disk) in an internal data structure or database.

In step S204, the analytics data consumer 24 sends an analytics function discovery request/subscription with a set of query parameters and a request/subscription identifier. The query parameters contain target values or target ranges of values for different types of parameters and the type of analytics to be carried out (the latter being identified by an Analytics ID). In the example of FIGS. 2A-2B, the message specifies that the query targets UE1 to UE5 for a given validity period. More generally, the same types and ranges of parameters as for the analytics function registration may be used. Therefore, the same type of data structure (as described further on) may be used to describe the parameters of the rich query. Other parameters may comprise expiration time or other standard means to maintain an up to date mapping. Additional details of this request are provided in a further section.

According to another embodiment, the request/subscription identifier is created by the CDS and is not generated and sent by the analytics data consumer. [ono] In step S205, the CDS 23 computes (compares, matches) the request/subscription against the registered capabilities and finds relevant analytics function instances, e.g., #1 (20) and #2 (21) respectively providing partial service, e.g., UE 1-2 and UE 3-5, respectively. Upon success, the CDS 23 may insert a new mapping table entry with the request/subscription identifier e.g., (subscription #1) as a first mapping table index useful for later retrieval, and a mapping table/values entry indicating the partial set of input parameters range each instances provides service for e.g., Subscription #1: instance #1, Filter UE 1-2; instance #2, Filter UE 3-5.

According to an embodiment, the CDS may generate analytics function instance requests or subscriptions that accurately adapt the filter information to the exact analytics function instance capability. This computed request may be sent to the analytics data consumer 24; see step S206.

According to a different embodiment, the CDS may generate the whole or part of possible analytics function instance requests or subscriptions that fulfills at least part of the filter information. This computed request can be sent to the analytics data consumer 24; see step S206.

In step S206, the CDS sends a response or a notification to the analytics data consumer 24, providing the set of analytics function instance identifiers and for each instance the parameter range or list of the initial request it can fulfill. In the example, the responses indicate two analytics function instances of interest e.g. analytics function instance #1 (20), #2 (21) with capabilities UE 1-2 and UE 3-5, respectively. The request may contain a subscription identifier generated in step S204.

In step S207, the analytics data consumer 24, having retrieved the analytics function addresses from received analytics function instance identifier, sends analytics function requests or subscriptions toward each analytics function instance. The analytics data consumer 24 sends whole or part of the original discovery request to the identified analytics function instances according to the analytics function instance service capabilities received from CDS 23.

According to an embodiment, an analytics data consumer may include a subscription identifier for being notified upon a capability update of an analytics function instance due to UE mobility or due to analytics data mobility (see further on in this description). This subscription identifier may have been generated in step S204.

According to an embodiment, the analytics data consumer request or subscription may indicate additional parameters or requirements depending on the request/subscription behavior. These additional parameters (described in the following) allow to filter further the results that could be provided by the service analytics function, therefore optimizing/minimizing the number of responses provided by the service analytics function by fully meeting the expectations of the analytics data consumer.

Maximum result time delay: the analytics data consumer may consider this indication with respect to the expected compute time that each analytics function instance can do. Depending on the expected value, the analytics data consumer may choose a different analytics function instance among a collection of analytics function instances that may provide directory service if several analytics function instances can fulfill the analytics data consumer request.

Exact request match flab: Exact data required or partial data accepted. In addition, when the maximum result time delay elapses, this may indicate whether or not the analytics function instance answers with an uncomplete response.

Fragmented answer: One answer for all or several answers depending on available data may be required or partial answer(s).

In step S208, the analytics data consumer 24 receives the request/subscription responses from the analytics function instances (20 and 21). If the analytics data consumer's request or subscription cannot be fulfilled against the specific requested input parameters, the response or the notification may indicate in the answer whether the expected request is fulfilled. The answer may indicate which part of the request is fulfilled and which part is not fulfilled, by adding a "fulfilled flag" to the response. An enhanced embodiment may consider a fine-grained fulfillment flag, for example regarding each particular analytics identifier or UE or Tracking Area Identity (TAI).

The analytics data consumer 24 may compute, from the set of received responses or notifications received, an aggregation of analytics data that fulfills its initial request in step S203. In the example of FIGS. 2A-2B, the arrangement of analytics data received from both instances #1 (20), #2 (21) exactly matches the request. According to another example, instance #1 (20) provides analytics for UE 1-2.

Steps S209, S210, S211 and S212 are similar to previous steps but relate to a new analytics function subscription request (subscription #2).

When an analytics function instance (here 20) obtains fresh data, step S213, it sends a corresponding update to the analytics data consumer 24 in step S214.

2.2 Service Reselection

This section describes embodiments related to provision of service reselection upon analytics data update and mobility.

2.2.1 Centralized Service Update from CDS

The CDS mediates between updated capability registrations and ongoing analytics function request and subscriptions.

Figure 3A:
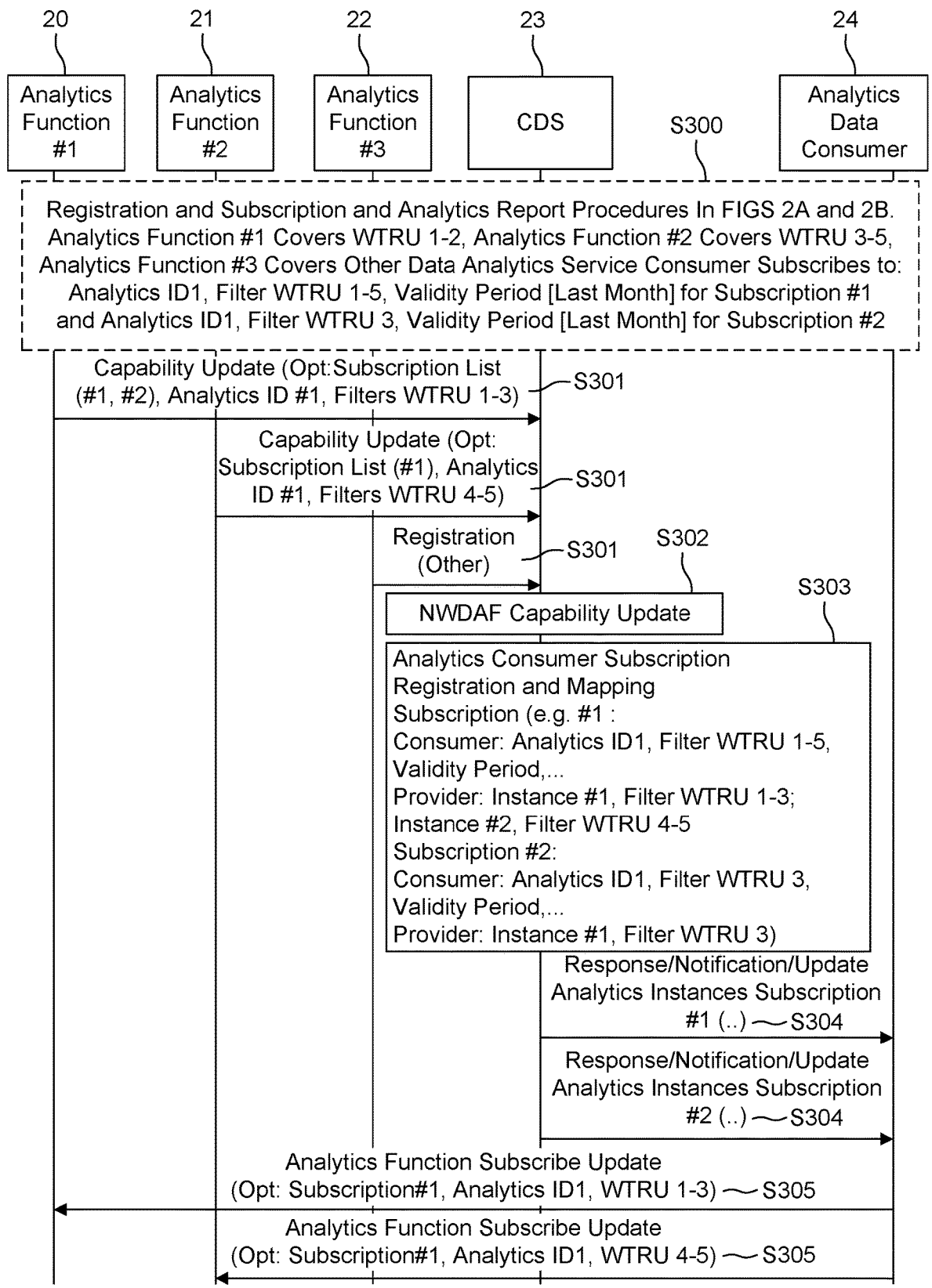
FIGS. 3A-3B are a sequence diagram illustrating an embodiment of a method for updating analytics function instances.
Figure 3B:
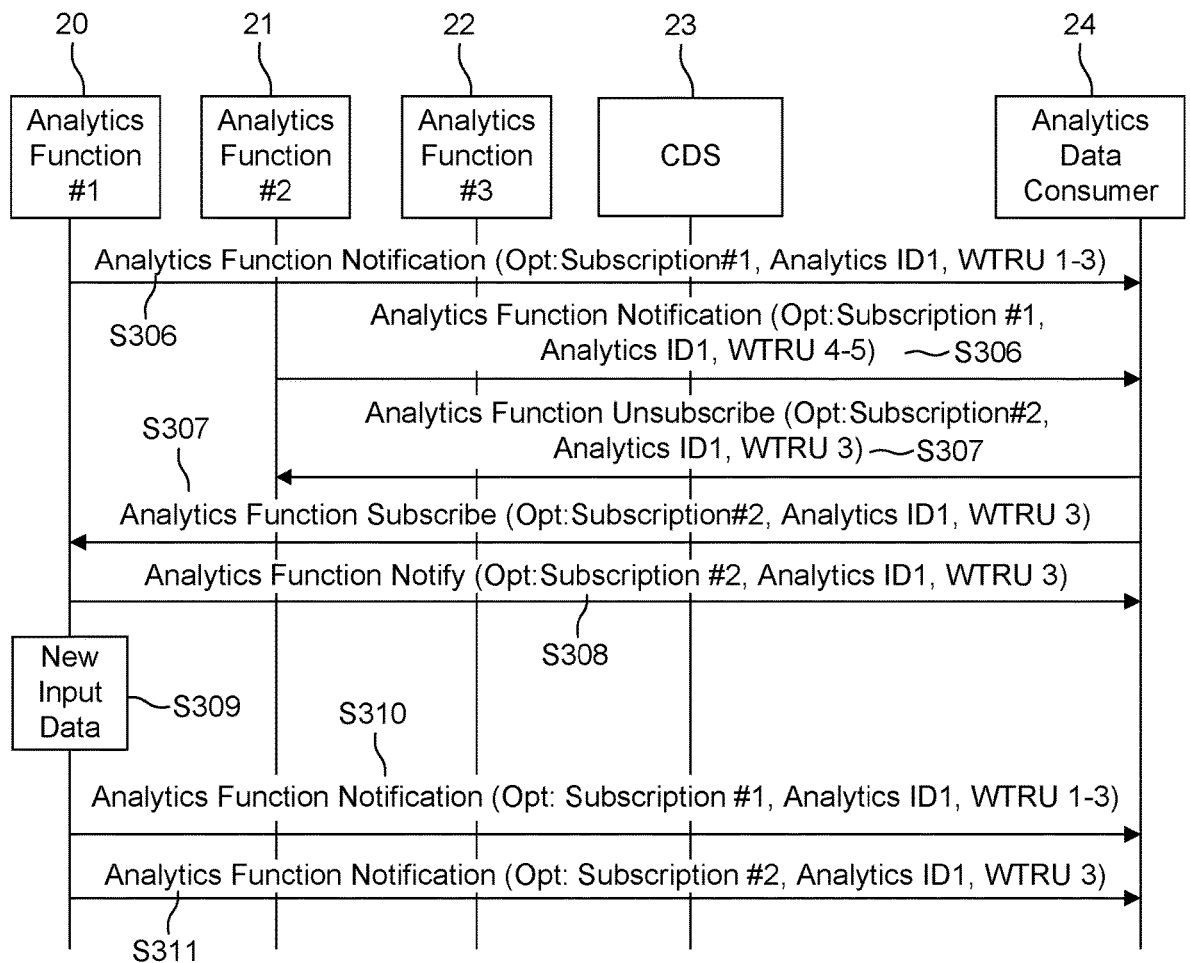

FIGS. 3A-3B are a sequence diagram illustrating an embodiment of a method for updating analytics function instances and how this impacts former analytics function instances requests/subscriptions. FIGS. 3A-3B show the same entities as in FIGS. 2A-2B. Upon a capability update, the CDS may notify the new individual capabilities to the analytics data consumer 24. If at the end the same analytics function instances are required after the update, the CDS may choose not to notify the analytics data consumer. In the above example the data related to UE 3 has moved from analytics function instance #2 (21) to analytics function instance #1 (22) because of UE mobility.

According to another example (not shown), where analytics function instance #2 (21) updates capability from UE 3-5 to UE 4-5 and a new analytics function instance #3 (22) registers a new capability for UE 3, the CDS may send a notification including analytics function instance #3 (22).

Step S300 encompasses the steps of FIGS. 2A-2B.

Step S301 is similar to step S201 in FIG. 2A, a difference being that one or more capability updates to capability registrations are sent in step S301 from the analytics functions to the CDS 23, whereas the capability registrations themselves are sent in step S201. The capability update contains a rich description of the parameters and parameter ranges supported by the analytics function instance. According to an embodiment this message transports a rich NwdafInfo data structure (detailed in a further section) describing the capabilities of the NWDAF. In addition, the analytics function instance may include a set of subscription IDs, which identifies the set of subscriptions that the analytics function instance currently serves.

In step S302, the CDS 23 updates the capability in the registry, e.g. by storing the update (in RAM or disk) in an internal data structure or in a database.

In step S303, the CDS 23 verifies if the updates impact any ongoing subscription from analytics data consumers 24.

Upon identification of the impacted subscriptions, the CDS 23 sends, in step S304, a message for each ongoing impacted subscription to the corresponding analytics data consumer(s) 24. The message(s) can be equivalent to the message in step S206 in FIG. 2A. The message(s) provide the set of the analytics function instances identifiers and, for each analytics function instance, a parameter range or list of the initial request it can fulfill. The message may also include the concerned subscription ID, such that the analytics data consumer knows to which subscription the message refers.

Depending on the update in step S301, the analytics data consumer 24 may update its former subscription. According to an embodiment, in step S205, the analytics data consumer 24 sends subscription updates to concerned analytics functions; for example, for UE 1-3 from instance #1 (20) and UE 4-5 from instance #2 (21). In step S206, the concerned analytics functions, in the example instances #1 and #2, return notifications to inform the analytics data consumer 24 of the accepted subscriptions.

As described, a same subscription for the same parameter (e.g. UE) can be valid for a plurality of analytics function instances, for example when the previous analytics function instance keeps required analytics data from a different (e.g., previous) time range.

According to another embodiment, in step S207, the analytics data consumer 24 may explicitly unsubscribe from previous analytics function and may subscribe to another analytics function by sending one or more analytics function unsubscribe messages including information about the unsubscription to the concerned analytics functions. In step S208, the analytics functions can respond by sending notifications to the analytics data consumer 24.

In step S209 new data is received by an analytics function, in the example by analytics function #1. In steps S210 and S211, the network analytics function with the new data provides analytics to the consumer(s) according to the subscriptions concerned. In the example, analytics function #1 sends a message for subscription #1 with analytics data for UE 1-3, in step S310, and a message for subscription #2 with analytics data for UE 3, in step S311.

According to an embodiment, the former subscription indicates a validity period which requires data from previous and current instances. In the latter case, the analytics data consumer may need analytics function instance #1 (20), analytics function instance #2 (21) for UE 3 if the validity period includes UE 3 analytics resulting from both analytics function instances.

2.2.2 Enhancement with Tracking and Binding

The previously described embodiments provide a "stateless mapping" method in that there is no tracking of the link between analytics function subscription and the former directory service subscription: the directory service (CDS) notifies a mapping entry to the analytics data consumer, but this mapping entry has no status/indication/state on whether or not the analytics data consumer subscribes to the exact or to the partial mapping entry notified by the CDS.

There are advantages and drawbacks to considering stateless or stateful mapping entries. Stateless mapping entries make CDS instance migration easier. On the other hand, the CDS must maintain more, sometimes unused, entries and may therefore need to introduce a validity period for each subscription requiring regular update from analytics data consumers to provide for service continuity. Stateful mapping entries according to the presently described embodiment leverage means for binding and maintaining a state of the service discovery and analytics data consumer subscriptions/(un)subscription. This tracking allows to link update/reselection for the different subscriptions.

According to an embodiment, the idea is therefore to track or bind the set of analytics function request(s)/subscription(s) sent by the analytics data consumer to the analytics function instances to the related discovery request/subscription sent by the analytics data consumer to the CDS and related discovery answers/notifications received from the CDS.

Figure 4A:
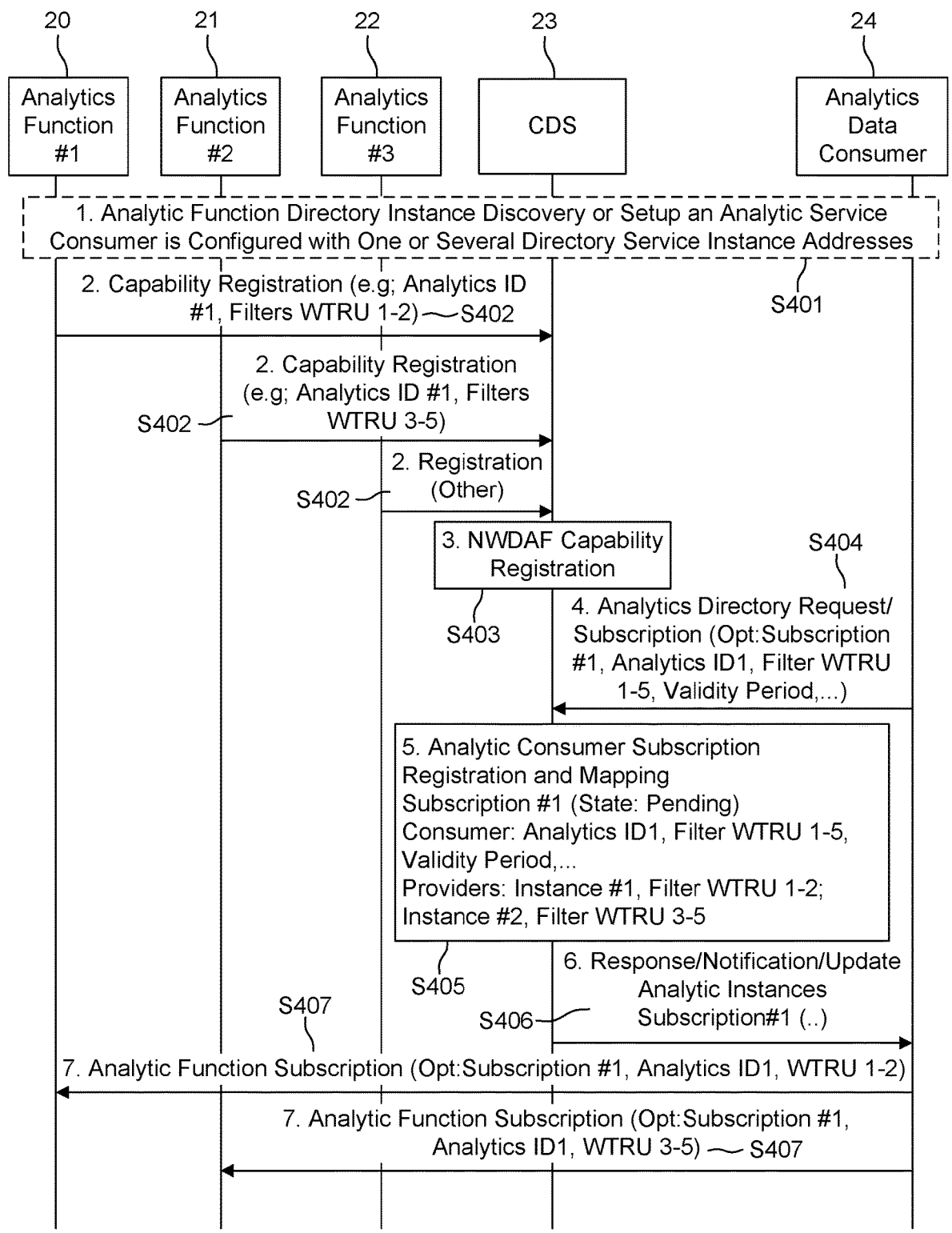
FIGS. 4A-4B are a sequence diagram illustrating a method for stateful analytics service directory mapping according to an embodiment.
Figure 4B:
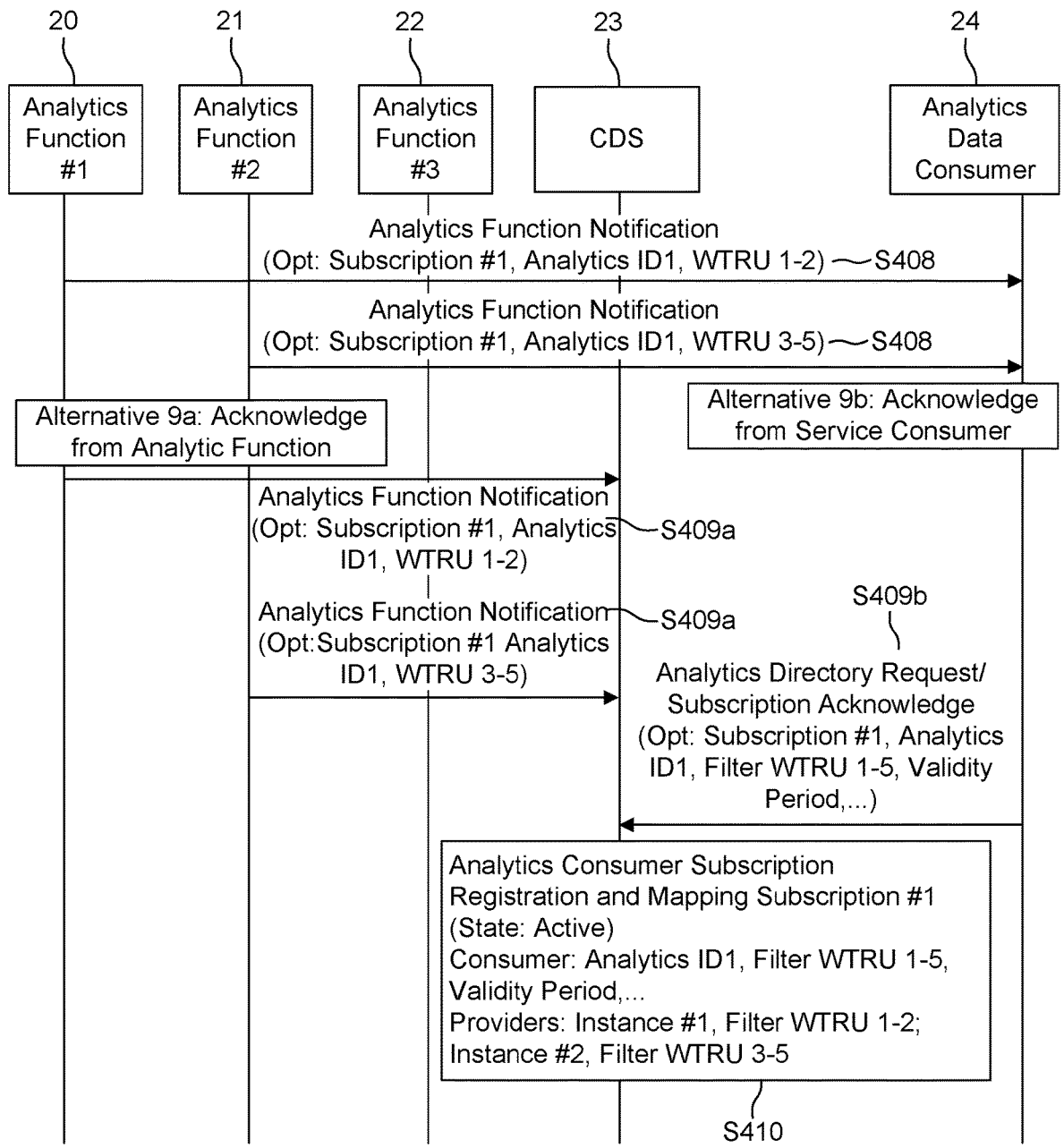

FIGS. 4A-4B is a sequence diagram illustrating a method for stateful analytics service directory mapping according to an embodiment.

Steps S401-S408 are the same as steps S201-S208 in FIG. 2A.

According to an embodiment, each discovery answer/notification received by an analytics data consumer from the CDS may include a set of analytics function request/subscription proposals (i.e., the mapping entry values discussed previously). The CDS may thereafter receive and register acknowledgements of related analytics request(s)/subscription(s) either directly from the analytics data consumer (alternative #9*b* in FIG. 4B), or from individual analytics functions (alternative #9*a* in FIG. 4B), further described hereafter. The CDS receives a directory answer/notification acknowledgements including at least the unique discovery requests/subscription identifier and possibly the subset of mapping entry values corresponding to analytics request(s)/subscription(s) parameters sent or to be sent by the analytics data consumer to related analytics functions.

According to an embodiment, the CDS may, in step S410, manage a corresponding mapping entry state depending on the received acknowledgement. According to an embodiment, it keeps internally either the state or the mapping state together with the unique subscription identifier.

Upon service handover and reselection, a CDS receiving an analytics data provision capabilities update from an analytics function may only process the acknowledged mapping entries. As a result, the CDS may only notify updates related to discovery request(s)/subscription(s) that have actually been sent by the analytics data consumer to the analytics function instances. The acknowledgment may comprise the unique analytics data consumer requests/subscription identifier. According to an embodiment, the acknowledgement may comprise the chosen subset of mapping entry values corresponding to analytics request(s)/subscription(s) parameters sent or to be sent to analytics functions.

According to a first binding/tracking embodiment (alternative 9*b* in FIG. 4B), the CDS 23 may, in step S409*b*, receive analytics subscription acknowledgments from the analytics data consumer 24 when the analytics data consumer has sent the set of subscriptions to the analytics functions. According to an embodiment, the analytics data consumer may wait for at least whole or part of notifications resulting from related analytics function subscriptions. According to an embodiment, the analytics data consumer may send an acknowledgement immediately before subscribing or updating analytics subscriptions. The acknowledgement may also comprise a completeness indication field that can include one of the following indications.

Complete: the analytics data consumer considers its chosen acknowledged answer as complete. In this case, if the CDS's answer does not fulfill the original request, the CDS may keep the mapping entry containing the partial fulfillment without trying to look for further data analytics to fulfill the initial directory request;

Partial acknowledgement: the analytics data consumer may subscribe for analytics data covering part of the original request whilst continuing to wait for the CDS to answer/notify an update of the mapping entry that fulfills the original request;

Waiting: the analytics data consumer does not subscribe analytics data and waits for an update of a mapping entry;

Reject: the analytics data consumer rejects the notification/answer with a reject parameter. The CDS may remove the mapping entry. The analytics data consumer may send a new request/subscription.

According to a second binding/tracking embodiment (alternative 9a in FIG. 4B), the CDS 23 may receive, in step S409a, analytics subscription acknowledgments from individual analytics functions 20-22. To that end, the analytics data consumer 24 first includes the service discovery request/subscription identifier within each request/subscription to the analytics function for data analytics and each analytics function may notify the CDS with the service discovery request/subscription identifier. As a result, the CDS will be able to retrieve the previous corresponding CDS request/subscription to update/maintain the corresponding mapping entry. Besides the reselection, the analytics function assists the CDS to find the impacted subscriptions and speeds up the service reselection upon service capabilities update.

2.2.3 Centralized Service Update from CDS

Figure 5A:
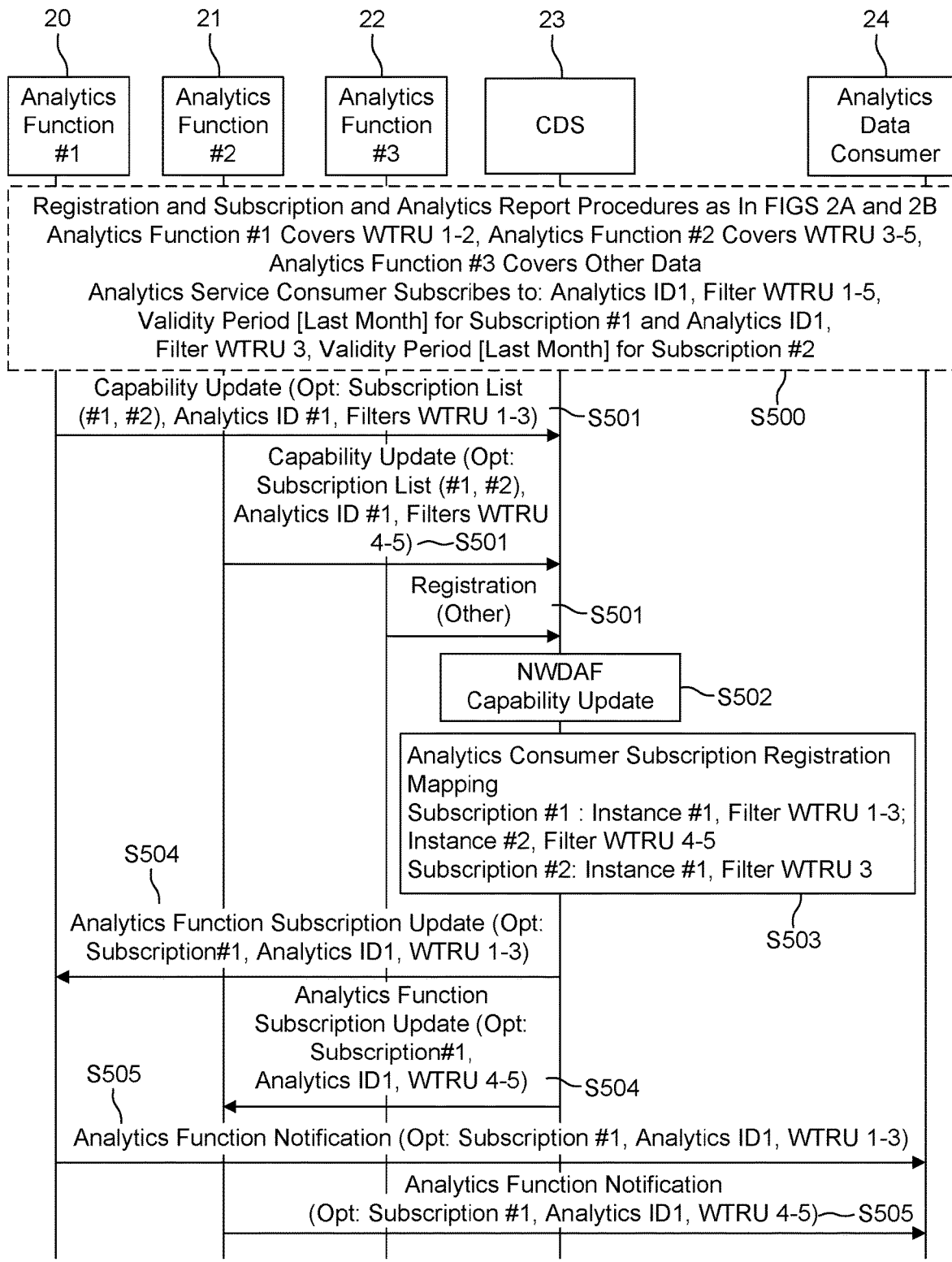
FIGS. 5A-5B are a sequence diagram illustrating an embodiment of a method for analytics instance directory service update that is transparent for the analytics data consumer.
Figure 5B:
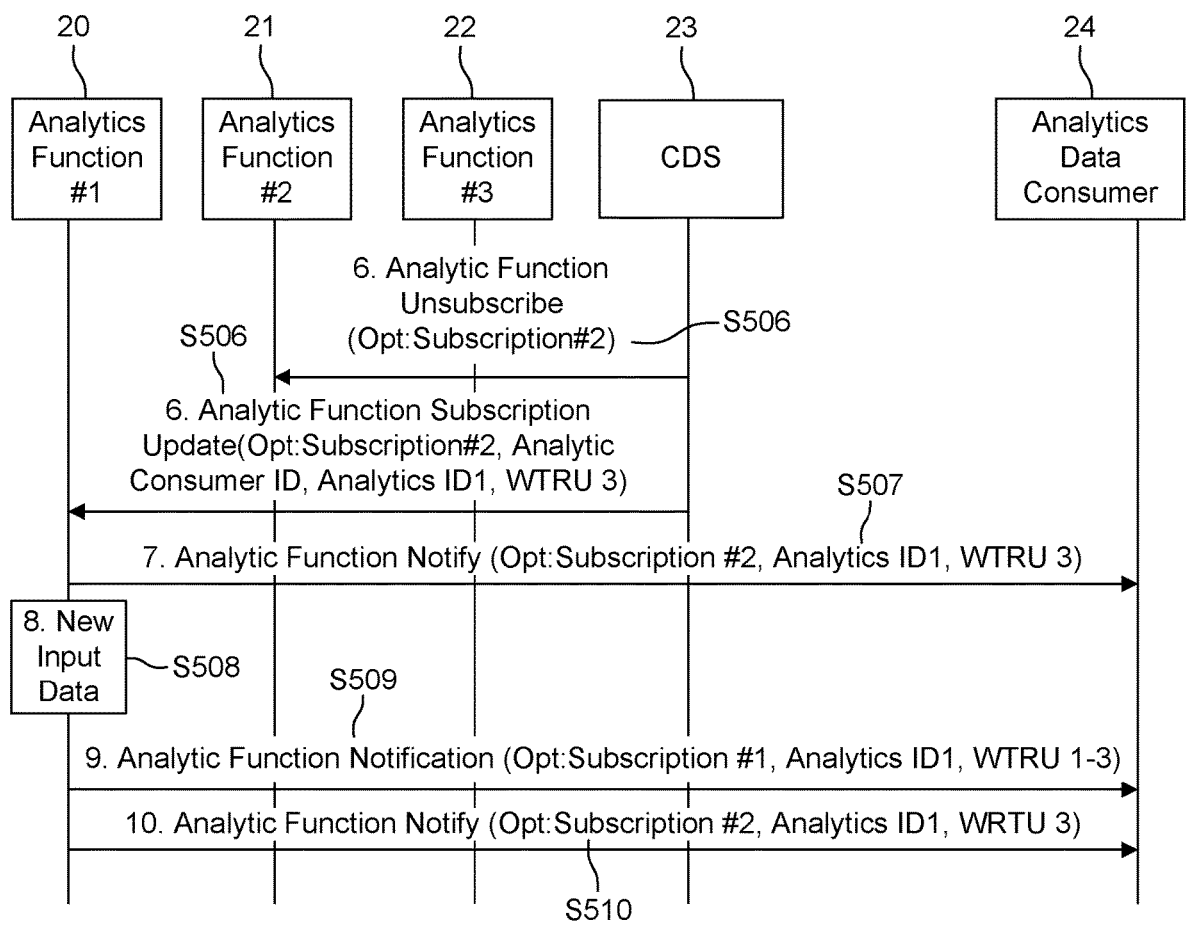

FIGS. 5A-5B is a sequence diagram illustrating an embodiment of a method for analytics instance directory service update that is transparent for the analytics data consumer. An analytics data consumer may transmit an optional transparent mode to the CDS. This allows the CDS to update directly the subscription on behalf the analytics data consumer. This can speed up the service reselection. At the end or in parallel, the analytics function discovery may notify the analytics data consumer that it already updated the subscription on behalf of it. This can be particularly useful when the mapping entry comprises new analytics function instances. The analytics data consumer may be informed that it will receive data analytics from a new analytics function.

The optional subscription identifier that is transmitted from an analytics data consumer to the analytics functions, and then to the CDS, may be used to track the subscription to update.

The use of the transparent mode may, according to embodiments, either be used by default, have been selected via configuration, or requested by the analytics data consumer by sending a message to the CDS containing a "transparent mode" indicator (e.g., a flag that according to embodiments, may be transmitted for a given subscription or globally for a given analytics data consumer, and this kind of information may be included in the message). In the latter case, if the indicator is set to "on" (e.g., set to a value 1) then the CDS will use the transparent mode for the related requests and subscriptions.

Steps S501-S503 are equivalent to the steps S301-S303 in FIG. 3A.

In step S504, the CDS 24 notifies the analytics functions involved in a subscription (in the example, subscription #1) of the parameters they are to use for the subscription by sending an analytics function subscription update message to each analytics function with a parameter range or list to which the analytics function should respond. The message can also include the concerned subscription ID, so that the analytics data consumer knows to which subscription this message refers.

In step S505, the involved analytics functions 20-22 send analytics function notification messages (including the analytics results) directly to the analytics data consumer 24. Such a message also includes the range and list of parameters served by the analytics function.

In case a subscription is transferred from one analytics function to another (new) analytics function, in step S506, the CDS 23 sends an unsubscribe message to the analytics function initially serving the subscription (in the example, analytics function #2) and a subscribe or update message to the new analytics function (in the example, analytics function #3). The subscribe message includes the subscription ID of the request, information required to identify and contact the analytics data consumer and analytics ID and the parameter range or list the analytics function should serve.

In step S507, the analytics function receiving the subscribe or update message sends an analytics function notification message (containing the analytics results) directly to the analytics data consumer. The message also contains the range and list of parameters served by the analytics function.

In steps S508-S5010, when new data is received, the network analytics function provides analytics to the consumer according to the concerned subscriptions, as described in for example FIG. 3B, steps S309-S311.

2.2.4 Reselection Using Partial Transfer Directly Between Analytics Functions According to an embodiment, the analytics data consumer provides a subscription context which indicates to an analytics function at least which other analytics functions are selected by the analytics data consumer to cover a requirement for analytics data. This can help the analytics functions identify the best target for transfer of a subscription, i.e., by trying to choose an analytics function already used by the analytics data consumer instead of a new one.

When an analytics function involved in the query changes its capabilities such that a partial transfer of the subscription is required, it queries the CDS to get a new list of analytics functions that may serve the query related to the partial transfer. Based on the list of analytics functions that the analytics data consumer initially provided, the analytics function may, e.g. preferably, select analytics functions currently serving the query. The analytics function sends a partial transfer request to the selected analytics function and provides the updated list of the analytics functions that serve the analytics data consumer. The analytics function notifies the other analytics functions serving the analytics data consumer of the transfer providing the new list of analytics functions that serve the analytics data consumer The list of analytics functions and this procedure may also useful and applicable in the case of a full subscription transfer (i.e., not a partial transfer) from one NWDAF to another.

3 Registration/Request Parameters and Mapping Considerations

3.1 Capability Registration Details

This section provides further details about step S202 in FIG. 2A.

According to an embodiment, each analytics function instance (#1 (20), #2 (21), #3 (22)) registers or updates its analytics function service capabilities according to a set of input parameters (i.e., input to the CDS—instead of the term 'input', the terms 'possible', 'valid' or 'serviceable' analytics function parameters may be used) with, according to a further embodiment, the boundaries of the parameters that the analytics function can provide. According to an embodiment, when an input parameter does not include boundaries, the registration capability may cover all parameter values. According to an embodiment, the registration may comprise:

- the identification (e.g., analytics ID) of the analytics type (e.g., NF Load Analytics, Network Performance Analytics, Observed Service Experience Related Network Data Analytics);
- whole or part of the set of parameters related to queries for the analytics type (e.g., Time Window, Area, S-NSSAI, UE, Internal Group Identifier, Application ID); and
- an optional parameter boundary associated with each parameter above. The optional parameter boundary may be, for example, a list of values (e.g., UE 1, UE 3, being identifiers of the UEs from which the analytics function has data and therefore can provide analytics based on this data), a range of values (e.g., UE 1-3), a combination between a list and a range (e.g., UE 1, UE 5, UE 10-20).

According to an embodiment, analytics function service registration comes with additional time and geographical limitations or precisions and a registration may therefore indicate additional information such as for example:

Time Window: an analytics function instance may provide a specific time window. Possibly depending on the computing power of its hosting machine, a particular instance may only provide a limited time window for a specific analytics while another one may provide a fine-grain time window precision. Examples are analytics from year 2019, last month, from beginning of the year, from a specific date, from a date range.

Sampling Period: an analytics function instance may provide different sampling capabilities to provide different levels of precision for given analytics. The Sampling Period may be related to the Time Window. Similar to the Time Window, the Sampling Period may vary between different instances, and this variation may be according the computing power of the hosting machine. Examples are per minute, per hour, per day, per month, per year.

Expected Compute Time: gathering analytics data from different time window(s) and/or sampling period(s) may require different amounts of time to compute and to send back a related response. As a result, in addition to providing the Time Window and Sampling Period capabilities, an analytics function instance may indicate how long it takes (or it is expected to take) to compute the expected response with respect to given parameters. Examples are Time Window: Year, Sampling Period; Day, Expected Time result: 20 ms, and Time Window: Year, Sampling Period; Minute, Expected Time result: 2 s.

Spatial Validity: an analytics function instance may provide analytics for given geographical area(s) only. Examples are Region, Town, List of Regions, List of Towns.

Data Availability Duration: the analytics function instance gives the duration limit of the analytics function performed and the availability of the analytics data provided. For example, the analytics function may keep data only for a certain duration; e.g., analytics data for the year 2019, may no longer be kept/be available after Feb. 1, 2020.

Validity Period: an analytics function may provide statistic data or prediction data. The prediction may be accompanied by a Validity Period expressing the validity time period, i.e., for which the prediction is valid.

3.2 CDS Request/Subscription Details

This section provides further details about step S204 in FIG. 2A.

An analytics data consumer may send, to the CDS, an analytics service discovery request or a subscription request. Parameters that may be provided in a request or a subscription may both be the same. According to a different embodiment, e.g., related to 3GPP, requests and subscriptions may be distinguished, and each may have a different set of parameters. According to an embodiment, the discovery or subscription request may comprise optional boundaries in the request parameters and additional time and geographical area(s), quite similar to the analytics function instance registration request (step S202 in FIG. 2A) described previously. The analytics data consumer may consider additional parameters and related boundaries to the CDS such as for example:

Requested Maximum Result Time Delay: the CDS may consider an indication with respect to the Expected Compute Time received from the analytics function instances upon their registration to the CDS. Depending on the Requested Maximum Result Time Delay value, a CDS may choose an analytics function instance among a collection of analytics function instances that may provide the requested analytics function in the requested maximum result time delay if several analytics service instances can fulfill the analytics data consumer request, based on a matching of the Requested Maximum Result Time Delay to the Expected Compute Time;

Notification Update Interval: this parameter indicates the time interval/frequency with which the analytics data consumer would like to receive updates/notification of its analytics subscription;

Completeness Result Indication: an indication, from the analytics data consumer, whether it accepts partial results. The (set of) analytics function instance(s) registered in the CDS may or may not be able to completely fulfill the request for analytics data and thus the CDS may, in a response, indicate the completeness of the result (that is, the returned set of analytics function instances can fully answer the query) or the lack of completeness (e.g., indicating that the returned set of analytics function instances can satisfy only a subset of the data/parameters, or, said differently, the returned set of analytics function instances can only partially answer the query); and Parameter Boundary Limitations: the CDS may provide, in its answer to the request/subscription to the analytics data consumer, the parameter boundaries limitations when the whole request/subscription cannot be fulfilled according to the indications/parameters provided by the analytics data consumer.

3.3 Mapping Consideration Details

This section concerns details about step S205 in FIG. 2A.

The CDS has registered the capabilities of a set of analytics function instances according to the set of input parameter ranges or lists provided by each analytics function instance during the service analytics instance registration phase (or service analytics instance update phase).

As described, in step S205, the CDS computes (compares, matches) the request subscription against the registered capabilities (of the analytics function instances) and finds relevant analytics function instances that may provide analytics data corresponding to the request/subscription. The CDS may insert a new mapping table entry with the request/subscription identifier, e.g., subscription #1, as a first mapping table index useful for later retrieval and a mapping table/values entry indicating the partial set of input parameters range each instances provides service for e.g., Subscription #1: instance #1, Filter UE 1-3; instance #2, Filter UE 3-5. The CDS may generate analytics function instance requests or subscriptions that accurately adapt the filter information to the exact analytics function instance capability. This computed request may then be sent to the analytics data consumer in step S206 in FIG. 2A.

The parameters provided by the analytics data consumer in its CDS
request/subscription may include one or more of:
Analytics function Instance Identifier;
Type identification: e.g., for 3GPP Observed service experience ID;
Filter information: e.g., range or list of UEs, white list, all UEs except a blacklist;
Validity periods: e.g., past 7 days, past month;
Spatial validity: e.g., range or list of TAIs; and
Sampling rate: e.g., every minute, every hour.

The mapping identifies and keeps an update of the set of analytics function instances and their individual capabilities that together fulfill the set of input parameter range or list of the subscription of the analytics data consumer.

The following example illustrates possible parameters (input) and expected output of/following an analytics data consumer request or subscription:

---

Analytics data consumer identifier: analytics data consumer #A
Input:
   Request Type: subscription;
   Notification rate: every hour;
   Notification schedule: date [Day/Month/Year], Hour [hour/minutes];
   Analytics ID: e.g., for 3GPP: Observed service experience ID
     Filter information: UE 1-5;
     Analytics period [start: Day/Month/Year; end: Day/Month/Year];
     Sampling rate [hour]
Output:
   Request fulfilled flag: Yes;
   Instance identifier: e.g., instance #1
     Analytics ID: e.g., for 3GPP: Observed service experience ID
      Filter information: UE 1-3.
   Instance identifier: e.g., instance #1
     Analytics ID: e.g., for 3GPP: Observed service experience ID
      Filter information : UE 4-5.

---

4 Embodiments Related to 3GPP

There are a number of subscription/notification identifiers within the context of a 3GPP system.

The subscription correlation ID is part of the general network exposure framework: "When the subscription is accepted by the Event provider NF, the analytics data consumer NF receives from the event provider NF an identifier (Subscription Correlation ID) allowing to further manage (modify, delete) this subscription."

There is also a Notification Correlation ID allowing the Event Receiving NF to correlate notifications received from the Event provider with its subscription: "The Notification Correlation ID is allocated by the analytics data consumer NF that subscribes to event reporting and the Subscription Correlation ID is allocated by the NF that notifies when the event is met."

When an NRF service analytics data consumer uses NFStatusSubscribe, to be notified of newly registered NF Instances in NRF, or to be notified of profile changes of a specific NF Instance, or to be notified of the deregistration of an NF Instance, the NRF includes a Subscription ID in the response to the subscription creation request.

None of these subscription/notification identifiers correspond to a request/subscription identifier which indexes a mapping entry, as described in the previous sections. A 3GPP embodiment would benefit from the addition of such an identifier to NFDiscovery operations, its use by the NRF to track updates of NWDAF instance NFProfiles and the addition to NFStatusUpdate/Notify operations so that the NWDAF service analytics data consumer can be readily informed.

4.1 NRF as a Service Directory

In a 3GPP 5G architecture, the Service Directory (CDS) may be implemented as an extension to the Network Repository Function (NRF). The NRF provides information about all NFs and their supported services in a Public Land Mobile Network (PLMN). For each NF, the NRF maintains an NF profile including information specific to each type of NF. For NWDAF, this specific information, held in the NwdafInfo data structure, only includes information on the type of analytics provided and the tracking area(s) covered. The NRF can for example be adapted to function as a CDS as follows.

The NF profile may be enriched by extending the NwdafInfo data to include additional information about the filters on the capabilities of the different analytics function instances, e.g., range or list of UEs, time windows, range or lists of applications functions (AFs). An example of such NwdafInfo is provided further on.

The registration/update operations of a NWDAF with the NRF may be modified to account for the increased size of the enriched NFProfile object. In particular, the NFRegister and NFUpdate operations of the Nnrf_NFManagement service are concerned.

The query/answer mechanisms for customer NF to query the NRF to find NFs may be modified so that requests including rich queries can be made and answers can contain them. In particular, the Nnrf_NFDiscovery_Request function may be modified to include the enriched NwdafInfo information as, for example, provided further on and the Nnrf_NFDiscovery_Response may be modified to return a set of instance identifiers and, for each instance, the range or list of the parameters in the initial request that it can fulfill. Furthermore, NFDiscovery operations may be extended to include a request/subscription identifier.

The subscription/notification mechanisms for a customer NF to register to an NRF for updates about a set of NWDAFs following certain filter criteria may be modified so that these filters can include parameters of rich queries. In particular, the NFStatusSubscribe may be modified to include the request/subscription identifier and the NFStatusNotify may be modified to return a set or a subset of instance identifiers and, for each instance, the range or list of the parameters in the initial request that it can fulfill or no longer fulfill.

For the transparent mode reselection, the NRF may have the added capacity to subscribe and unsubscribe from a NWDAF on behalf of another NF.

4.2 Describing an NWDAF Instance at the NRF

For the embodiments, the NWDAF instances may have an enriched description in a directory. There are several possible methods to describe the filters of a NWDAF. A few of them are provided in this section.

4.2.1 Describing One Parameter

Similar to what is done for TAIs, each value can be described by enumerating all valid values, by ranges of valid values or by a combination of both.

4.2.2 Describing Several Parameters

The description of the NWDAF may contain more than one parameter. These parameters may be listed one after the other. How these parameters interact with each other may be agreed upon. For example, the set of queries that the NWDAF may answer can be defined as the intersection of the valid values in its description. In other words, the NWDAF may answer queries whose parameters are all within the stored value or ranges for that NWDAF. According to another embodiment the set of queries that the NWDAF may answer is defined as any query where at least one parameter belongs to the valid values in its description.

According to an embodiment, these parameters are stored in a table as illustrated below ('O' stands for 'Optional': 'C' stands for 'Compulsory': 'Attribute name' is the name of a parameter, and some may refer to known 3GPP parameters):

| Attribute name | Data type | P | Description |
| --- | --- | --- | --- |
| eventIds | array(EventId) | C | EventId(s) supported by the Nnwdaf_AnalyticsInfo service, if none are provided the NWDAF can serve any eventId. |
| nwdafEvents | array(NwdafEvent) | C | Event(s) supported by the Nnwdaf_EventsSubscription service, if none are provided the NWDAF can serve any nwdafEvent. |
| Parameter1_list | array(value) | O | The list of values the NWDAF can serve for parameters 1. The absence of this attribute and the next attribute indicate that the NWDAF can cover all values. |
| Parameter1_range_list | array(value range) | O | The range of values the NWDAF can serve for parameters 1. The absence of this attribute and the previous one indicate that the NWDAF that the NWDAF can cover all values. |
| Parameter2_list | array(value) | O | The list of values the NWDAF can serve for parameters 2. The absence of this attribute and the next attribute indicate that the NWDAF can cover all values. |
| Parameter2_range_list | array(value range) | O | The range of values the NWDAF can serve for parameters 2. The absence of this attribute and the previous one indicate that the NWDAF that the NWDAF can cover all values. |

According to an embodiment, these values are stored as a list of possible values. A possible embodiment is shown in the following table:

| Attribute name | Data type | P | Description |
| --- | --- | --- | --- |
| eventIds | array(EventId) | C | EventId(s) supported by the Nnwdaf_AnalyticsInfo service, if none are provided the NWDAF can serve any eventId. |
| nwdafEvents | array(NwdafEvent) | C | Event(s) supported by the Nnwdaf_EventsSubscription service, if none are provided the NWDAF can serve any nwdafEvent. |
| Parameter_list | array(key_value_list) | O | The list of values the NWDAF can serve for all parameters. The absence of this attribute and the next attribute indicate that the NWDAF can cover all values for all parameters |
| Parameter_range_list | array(key_range_list) | O | The range of values the NWDAF can serve for parameters 2. The absence of this attribute and the previous one indicate that the NWDAF that the NWDAF can cover all values. | key_value_list is a pair (parameter id, array(value)) and key_range_list is a pair (parameter id, array(value range)).

The NWDAF may also be described as the union of NWDAF descriptions. As an example, one NWDAF may be able to provide answers for (TAI-1, UE-1) and (TAI-2, UE-2). In that case, the NWDAF may be described by a set of all valid NWDAF descriptions, for example as in the following table. In the table, the field "descriptors_list" contains a list of pairs of Parameter_list and Parameter_range_list. Each pair contains values (first field) and value ranges (second field) that describes a set of queries the NWDAF may answer. The NWDAF may answer any query that is described by at least one pair in descriptors_list.

| Attribute name | Data type | P | Description |
| --- | --- | --- | --- |
| eventIds | array(EventId) | C | EventId(s) supported by the Nnwdaf_AnalyticsInfo service, if none are provided the NWDAF can serve any eventId. |
| nwdafEvents | array(NwdafEvent) | C | Event(s) supported by the Nnwdaf_EventsSubscription service, if none are provided the NWDAF can serve any nwdafEvent. |
| Descriptors_list | array([Parameter_list, Parameter_range_list]) | O | The set of values the NWDAF can serve for all parameters. The absence of this attribute indicate that the NWDAF can cover all values for all parameters |

4.3 Analytics Service Discovery Procedure

Figure 6:
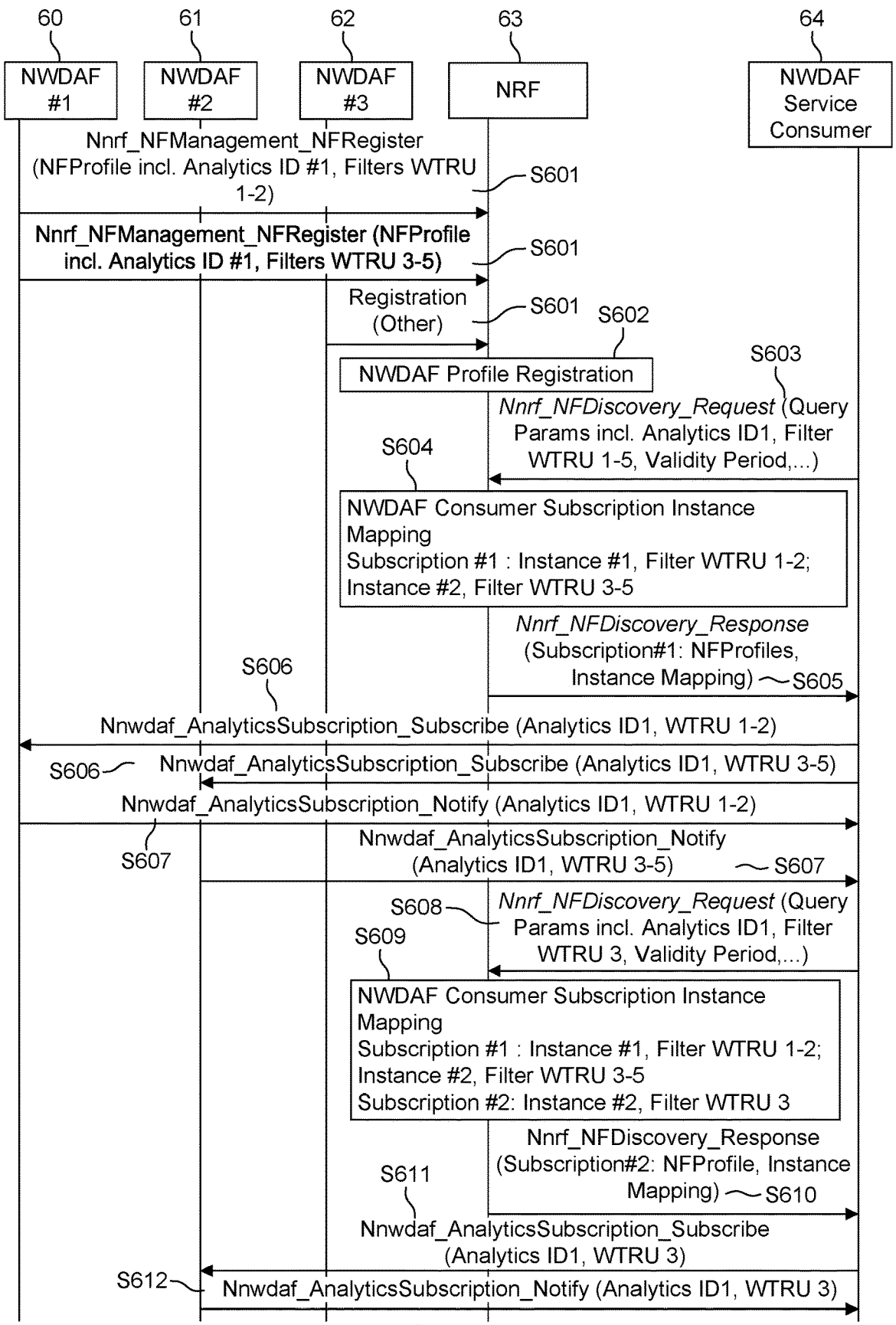
FIG. 6 is a sequence diagram illustrating a 3GPP embodiment of the embodiment illustrated in FIGS. 2A-2B.

According to an embodiment, extensions to the NFRegister and NFDiscover operations may be added together with the newly defined mapping functionality in the NRF. FIG. 6 is a sequence diagram illustrating a 3GPP embodiment of the embodiment illustrated in FIGS. 2A-2B, for example. In FIG. 6, the NWDAF #1, #2, #3, with references 60, 61 and 62 respectively, are 3GPP embodiments of the previously described Analytics Function Instances #1-#3. The NRF 63 is a 3GPP embodiment of the previously described CDS. The NWDAF service analytics data consumer 64 is a 3GPP embodiment of the previously described analytics data consumer.

Step S601: The NWDAFs 60-62 register their enriched NFProfiles with the NRF 63. The data in the nwdafInfo part of NFProfile is extended as described in the previous section.

Step S602: The NRF 63 stores the received NFProfiles.

Step S603: The NWDAF service analytics data consumer 64 contacts the NRF 63 in order to discover the NWDAF(s) capable of providing analytics service according to a set of rich query parameters, using NFDiscovery_request.

Step S604: The NRF 63 maps the analytics data consumer query parameters to the stored NWDAF capabilities in order to identify which NWDAF(s) can respond to which parts of the query.

Step S605: The NRF 63 responds to the analytics data consumer 64 with a request/subscription identifier, with the mapping of which NWDAF can respond to which part of the query and with the complete NFProfile of each relevant NWDAF, using NFDiscovery_Response. The received request/subscription identifier may be used by the analytics data consumer to subsequently subscribe to the NRF for mapping updates using the NFStatusSubscribe operation (see the next section).

Step S606: The NWDAF service analytics data consumer 64 subscribes to each or only some of the relevant NWDAFs 60-62 according to the mapping of step S605.

Step S607: The NWDAFs notify the service analytics data consumer of analytics events according to the subscription of step S606.

Steps S608-S612: Similar to steps S603-S607 enabling the analytics data consumer 64 to receive analytics for a new query.

4.4 Analytics Service Update and Reselection

Figure 7:
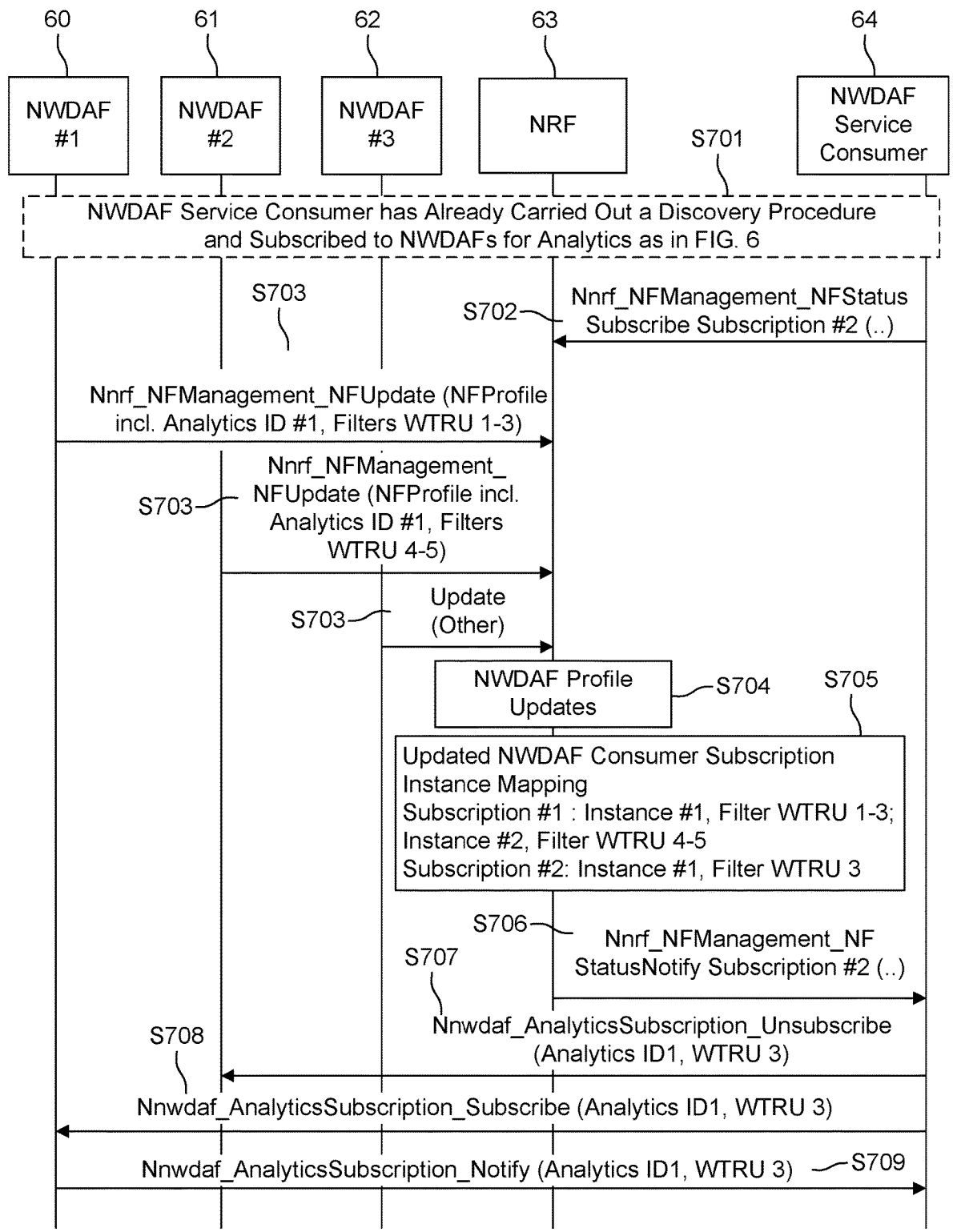
FIG. 7 is a sequence diagram illustrating an embodiment of a method for NWDAF registration update resulting in the analytics data consumer reselecting the serving NWDAF.

Extensions to the existing NFUpdate, NFStatusSubscribe and NFStatusNotify operations may be added together with the new mapping functionality in the NRF. FIG. 7 is a sequence diagram illustrating an embodiment of a method for NWDAF registration update resulting in the analytics data consumer reselecting the serving NWDAF. Like in FIG. 6, the NWDAF #1, #2, #3, with references 60, 61 and 62 respectively, are 3GPP embodiments of the previously described Analytics Function Instances #1-#3. The NRF 63 is a 3GPP embodiment of the previously described CDS. The NWDAF service analytics data consumer 64 is a 3GPP embodiment of the previously described analytics data consumer.

Step S701: The NWDAF service analytics data consumer 64 has already carried out discovery of NWDAFs 60-62 and subscribed to them for analytics events as described with reference to FIG. 6.

Step S702: The NWDAF service analytics data consumer 64 subscribes to the NRF 63 for NF status updates. The existing NFStatusSubscribe operation is extended to allow the service subscriber to specify for which request/subscription identifier updates are requested.

Step S703: The NWDAFs 60-62 update their NFProfile data stored in the NRF. In the example the UE Filters have changed from the original registrations. This could be, for example, be due to UE mobility.

Step S704: The NRF 63 stores the updated NWDAF NFprofiles.

Step S705: The NRF 63 updates its instance mapping to account for the updated NWDAF NFProfiles.

Step S706: The NRF 63 notifies the NWDAF service analytics data consumer 64 that there has been a change of NWDAF instance mapping for the subscribed status update. In the example, analytics for the UE 3 Filter are now performed by NWDAF instance #1 (60) whereas they were previously undertaken by instance #2 (61). The existing NFStatusNotify operation is extended to allow the NRF 63 to send an updated instance mapping relevant to the request/subscription identifier.

Step S707: The NWDAF service analytics data consumer 64 cancels its subscription (unsubscribes) to NWDAF instance #2 (61) for UE 3 analytics.

Step S708: The NWDAF service analytics data consumer 64 subscribes to NWDAF instance #1 (60) for UE 3 analytics.

Step S709: NWDAF instance #1 (60) notifies the service analytics data consumer 64 of analytics events according to the subscription in step S708.

4.5 Analytics Service Tracking and Binding

This section relates to 3GPP embodiments of tracking and binding embodiments described in previous section "2.2.2 Enhancement with Tracking and Binding".

4.5.1 Service Analytics Data Consumer Registers Acknowledgements with the NRF After an initial discovery of appropriate NWDAFs, as described in section "4.3 Analytics Service Discovery Procedure," the analytics data consumer may have a unique request/subscription identifier that may be used to register acknowledgements with the NRF concerning analytics requests/subscriptions made to NWDAFs. According to an embodiment, the existing Nnrf_NFManagement_NFStatusSubscribe operation is extended to carry these acknowledgements.

In section "2.2.2 Enhancement with Tracking and Binding," four scenarios for completeness of analytics requests/subscriptions are described. In all cases the Nnrf_NFManagement_NFStatusSubscribe operation may be extended to include the unique request/subscription identifier so that the analytics data consumer can receive notifications from the NRF concerning mapping updates. The four scenarios may have different requirements regarding other parameters needed to be added to the Nnrf_NFManagement_NFStatusSubscribe operation.

Complete, without acknowledgement. In case the service directory's mapping includes all the initial discovery parameters, the analytics data consumer may make an analytics request/subscription corresponding to all the requested parameters. In this case the request/subscription identifier may correspond to the initial mapping and the NRF may maintain the mapping until further NFProfile updates are received at which point it can notify the analytics data consumer. In case the service directory's mapping includes only a subset of the original request parameters, the request/subscription identifier may correspond to this reduced mapping. In this case the NRF may maintain the reduced mapping and the analytics data consumer may subsequently be notified of updates, possibly only for this reduced mapping.

Complete, with acknowledgement: the NRF may maintain the current mapping (though this may be the default behavior).

Partial: the analytics data consumer may subscribe to analytics for a subset of the complete mapping provided by the NRF. Without acknowledgement, the request/subscription identifier may correspond to the complete mapping and, once the NRF receives NFProfile updates from an NWDAF matching the identifier, the mapping may be updated and a notification may be sent to the analytics data consumer. With an acknowledge from the analytics data consumer, the request/subscription identifier may be re-mapped to the subset parameters, the NRF may prune its retained mapping and subsequent updates to the analytics data consumer may concern only the subset parameters.

Waiting: the analytics data consumer does not make an analytics subscription. Without acknowledgement, the request/subscription identifier alone may be sufficient for the NRF to notify the service analytics data consumer once the NRF receives NFProfile updates from an NWDAF matching the identifier. With an acknowledgement, the NRF may, for example, purge the current mapping whilst retaining the request/subscription identifier in order to notify the analytics data consumer once the NRF receives NFProfile updates from an NWDAF matching the identifier.

Reject: with acknowledgement, in addition to the request/subscription identifier, the NRF may purge the mapping from memory.

4.5.2 NWDAFs Inform NRF of Analytics Data Consumer Subscriptions Concerned by NFProfile Updates According to an embodiment, when NWDAFs send an NFProfile update to the NRF, they may also inform which of their active analytics subscriptions from analytics data consumers include parameters concerned by the update.

Extend Nnwdaf_AnalyticsSubscription_Subscribe operation allows an analytics data consumer to include the request/subscription identifier.

Extend Nnrf_NFManagement_NFUpdate operation allows a NWDAF to include a list of request/subscription identifiers concerned by the updated rich NFProfile (i.e., the updated profile adds/removes/modifies one or more parameters in the subscription).

4.6.1 Analytics Service Reselection, Transparent Mode

Figure 8:
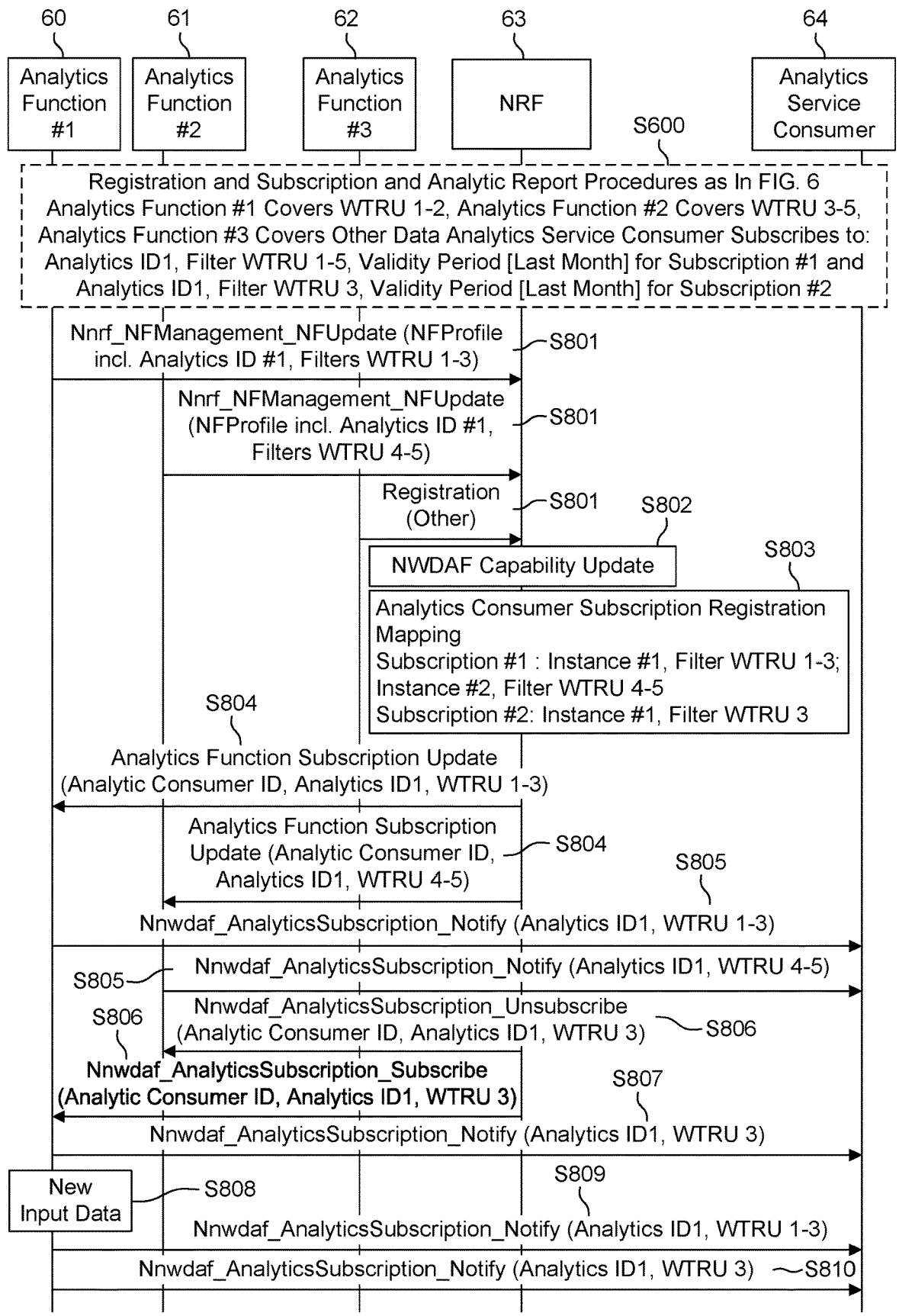
FIG. 8 is a sequence diagram illustrating an embodiment of a method for analytics instance directory service update, transparent for the analytics data consumer.

FIG. 8 is a sequence diagram illustrating an embodiment of a method for analytics instance directory service update, transparent for the analytics data consumer. Like in FIGS. 6 and 7, the analytics function entities, e.g. NWDAF #1, #2, #3 with references 60, 61 and 62 respectively, are 3GPP embodiments of the previously described Analytics Function Instances #1-#3. The Analytics Function Directory e.g. NRF 63 is a 3GPP embodiment of the previously described CDS. The entity NWDAF analytics data consumer 64 is a 3GPP embodiment of the previously described analytics data consumer.

Step S801: The NWDAFs 60-62 update their enriched NFProfiles in the NRF 63 using NFUpdate.

Step S802: The NRF 63 stores the updated NWDAF NFprofiles.

Step S803: The NRF 63 updates its instance mapping to account for the updated NWDAF NFProfiles and computes new subscriptions.

Step S804: The NRF 63 informs the NWDAF involved in a subscription (here subscription #1) of the new analytics data consumer subscription parameters to be used for the query from now on. According to an embodiment, a new function is added, Analytics_Subscription_ Update, that allows an NWDAF analytics subscription to be updated by the NRF 63 on behalf of the analytics data consumer 64. According to a different embodiment, this may be achieved by a sequential use of the existing Nnwdaf_AnalyticsS ubscription_Unsubscri be and Nnwdaf_AnalyticsSu bscription_Su bscri be operations, modified to allow the NRF 63 to act on behalf of the analytics data consumer 64.

Step S805: The NWDAFs 60, 61 notify the customer 64 NF using the notification mechanism.

Step S806: The new subscription relies on the same mechanism as step 5. According to an embodiment, a new function for the unsubscription on behalf of a customer NF is defined, or, according to a different embodiment, a modification of the Analytics_function_unsubscribe is defined to allow the NRF 63 to unsubscribe on behalf of a NF.

Step S807 is similar to step S805.

Steps S808-S810 shows new data/updates and corresponding notification to the analytics data consumer 64.

4.6.2 Reselection Using Partial NWDAF Analytics Subscription Transfer

According to an embodiment, the analytics data consumer provides a subscription context which indicates to a NWDAF at least which other NWDAFs are selected by the analytics data consumer to cover an analytics requirement. This helps the NWDAF identify the target to transfer a subscription, i.e., by trying to choose a NWDAF already used by the analytics data consumer instead of a new one.

Note that the list of analytics functions and the procedure below is also useful and applicable in the case of a full subscription transfer (i.e., not a partial transfer) from one NWDAF to another. The only difference relies in the fact that in step S909 of the below procedure a full subscription transfer is performed.

Figure 9A:
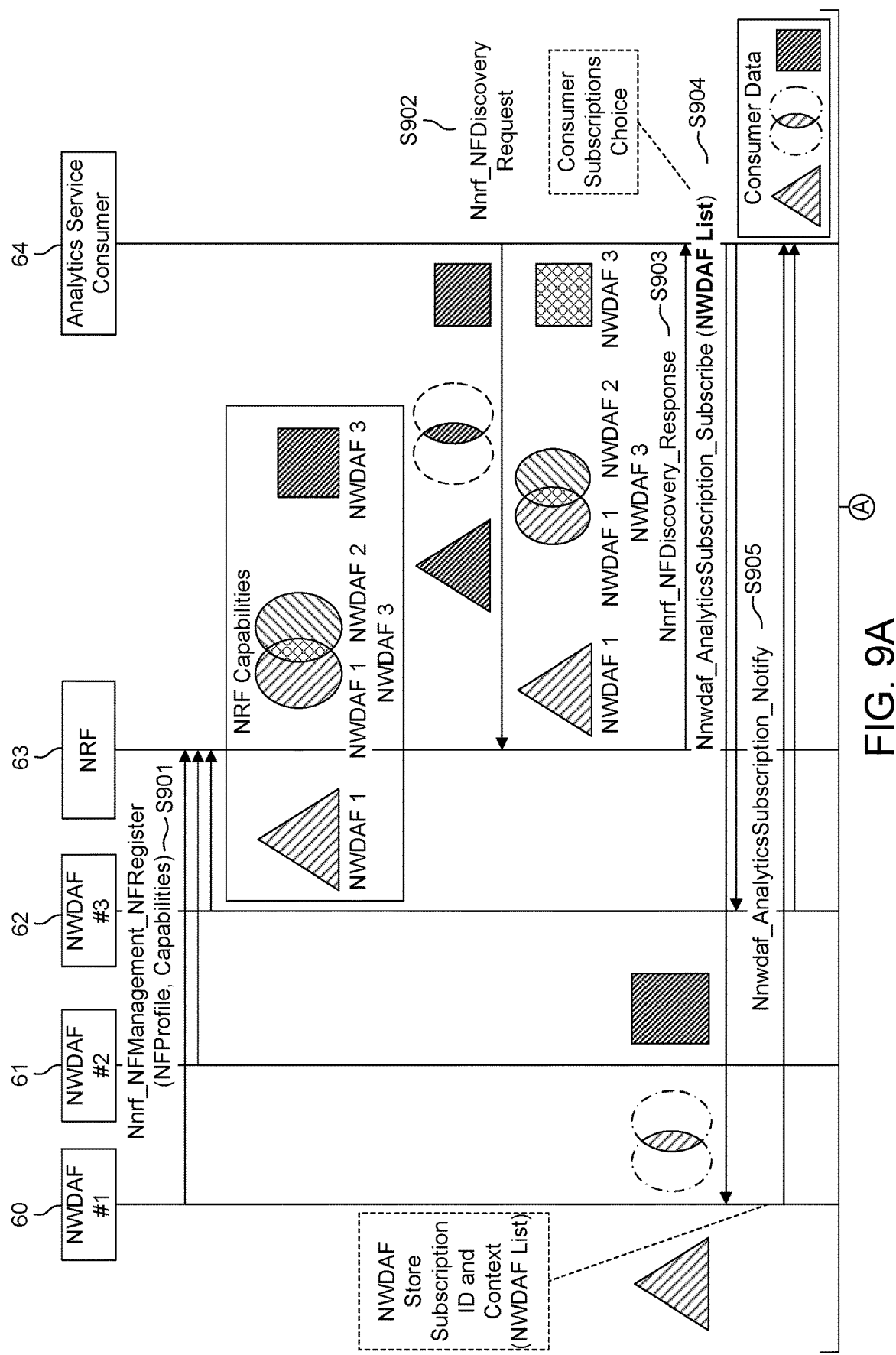
FIGS. 9A-9C illustrate an embodiment of an NWDAF registration update resulting in the transfer of part of an ongoing consumer analytics subscription from the source NWDAF to a target NWDAF.
Figure 9B:
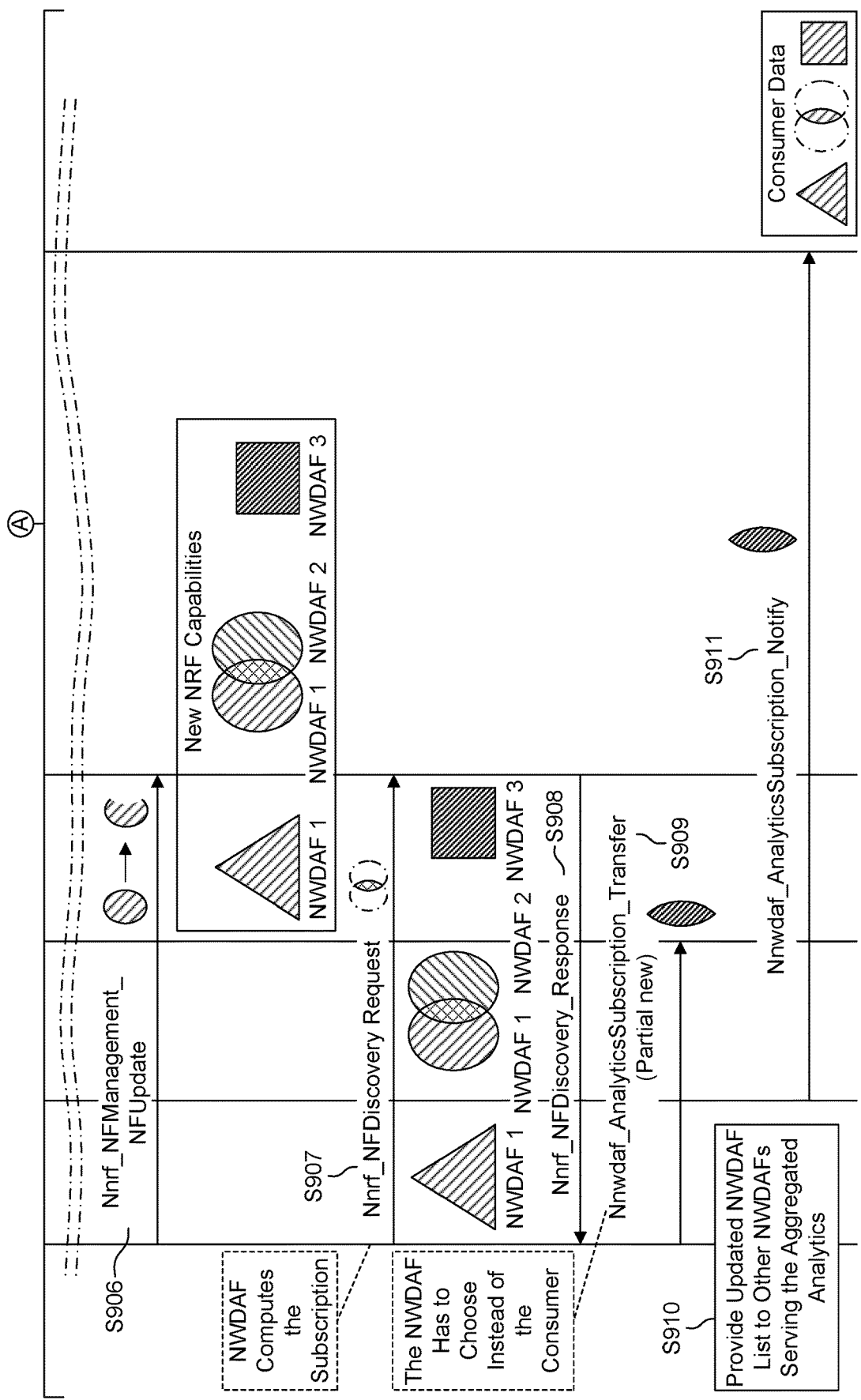

FIGS. 9A-9B is a sequence diagram illustrating a partial subscription transfer from one NWDAF to another that is transparent for the analytics data consumer and where the transfer is done preferably to a NWDAF that is already answering part of the query.

Figure 9C:
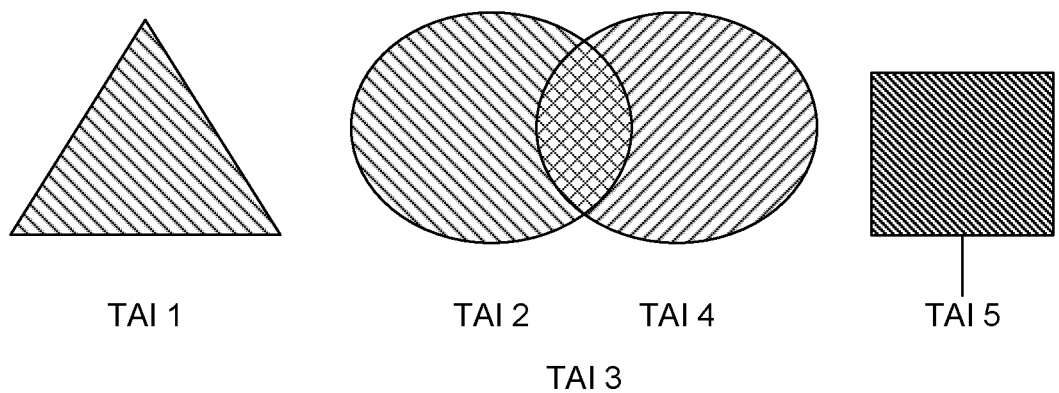

In FIGS. 9A-9C, sets of queried data or capabilities are represented as geometrical shapes (triangles, circles, squares, lenses). These sets may represent any of the NWDAF capabilities and subset of data and may typically be described by filters that restrict the capabilities and subsets. The parameters of these filters may for example include S-NSSAI; Analytics ID(s); Supported service(s), possibly with their associated Analytics IDs; NWDAF Serving Area information, i.e. list of TAIs for which the NWDAF can provide analytics and/or data; and NWDAF location information, if the selection is to decide candidates for analytics subscription transfer.

In the example depicted in FIG. 9C, the sets are characterized by their Tracking Area Identities (TAIs). The geometric shapes correspond to TAIs as follows. In the following, the term ascending/descending moon is used for certain geometrical shapes, corresponding to the shapes of the moon as observed in the northern hemisphere; ascending/descending moon refers to the position of the moon compared to the center of the earth. Triangle=TAI 1, descending half-moon=TAI 2, Lens (intersection between both circles)=TAI 3, ascending half-moon=TAI 4, square=TAI 5.

Referring again to FIGS. 9A-9B, in step S901, the Nnrf_NFManagement_NFRegister service operation is used by the NWDAFs to provide their NF Profiles to the NRF. Specific NWDAF data within the NF Profile is contained in the NwdafInfo attribute. The NWDAF data typically describes which TAIs, Analytics IDs, S-NSSAI are covered by the NWDAF. As indicated in the rectangle "NRF Capabilities", NWDAF 1 covers TAI 1, TAI 2 and TAI 3; NWDAF 2 covers TAI 3 and TAI 4, NWDAF 3 covers TAI 3 and TAI 5.

In step S902, the analytics data consumer may send a Nnrf_NFDiscovery request to the NRF to discover NWDAFs registered with the NRF which satisfy the given input query parameters. The input parameters may express the subsets of data and NWDAF capabilities that are relevant for the subsequent analytics query.

The parameters may e.g. specify the set of TAIs needed (e.g., TAI 1, 3, 5 in FIG. 9A).

In step S903, the NRF sends a Nnrf_NFDiscovery response containing an array of NWDAF NF Profile objects.

Using the preferredSearch data model (see e.g., TS 29.510) the NRF may indicate that a given NWDAF does not cover all the TAIs (or more generally the requested input parameters), but that only the set of returned NWDAF cover the entire set.

Step S904: The analytics data consumer may select the NWDAFs to be used, according to internal logic, and may subscribe to them for analytics information e.g., using Nnwdaf_AnalyticsSubscription_Subscribe. Each subscription may contain a list of the other NWDAF IDs that were selected by the analytics data consumer for analytics. For example, the subscription to NWDAF #1 shows that the analytics data consumer has also subscribed to NWDAF #3. Each NWDAF may store the listing of other NWDAF IDs, e.g., together with the subscription correlation ID (the latter may be generated by the NWDAF).

Step S905: The NWDAFs may use Nnwdaf_AnalyticsSubscription_Notify to provide to the analytics data consumer a Subscription Correlation Id that has been assigned to the analytics data consumer by the NWDAF. The NWDAFs also notify the analytics data consumer of the output analytics. A separate subscription is made to each NWDAF; it is assumed that the analytics data consumer performs aggregation. This analytics data consumer may be a NWDAF with aggregation capabilities.

Step S906: NWDAF #1 may send a message to the NRF to update its NF Profile parameters previously registered in the NRF. The Nnrf_NFManagement_NFUpdate operation may apply to the whole profile of the NF (complete replacement of the existing profile by a new profile), or it may apply only to a subset of the parameters. NWDAF #1 is no longer able to provide analytics to the analytics data consumer for the full range of parameters in the subscription.

In step S907, the NWDAF #1 may send an Nnrf_NFDiscovery request to the NRF to discover NWDAFs registered with the NRF which satisfy the given input query parameters, corresponding to capabilities no longer served, in line with the Nnrf_NFManagement_NFUpdate made in step S906.

In step S908, the NRF answers with a Nnrf_NFDiscovery response that may include an array of NWDAF NF Profile objects.

Step S909: From the list of NWDAFs received in step S908, NWDAF #1 may select an NWDAF for transfer of the analytics subscription for the capabilities it can no longer serve. This selection may give priority to NWDAFs in the list of the other NWDAF IDs that were selected by the consumer for analytics received in Step 4. The NWDAF may update the list of NWDAFs involved in the consumers query according to its selection. The NWDAF may use the Nnwdaf_AnalyticsSubscription_Transfer service operation to make the transfer of the analytics subscription to NWDAF #3 with which the consumer already has a subscription. The value of the Transfer type may be set to "Partial Analytics subscription transfer". The request may include the input parameters for analytics exposure (e.g., TS 23.288 v17.0.0 clause 6.1.3) corresponding to the part of the original subscription to be transferred. The transfer request may also contain a callback URI of the analytics data consumer, the subscription correlation ID and IDs of active data sources (i.e., the list of NWDAFs involved in the consumers query).

Step S910: The NWDAF may also inform other NWDAFs involved in the analytics data consumer's query of the (for example partial) transfer and provides the new list of NWDAFs involved in the analytics data consumer's query. This may ensure that all NWDAFs serving the analytics data consumer have an up-to-date list of NWDAF involved in the analytics data consumer's query. The NWDAF may use the Nnwdaf_AnalyticsSubscription_Transfer service operation by including for example a new transfer type i.e., analytics subscription context modification. An analytics subscription context modification may indicate that this specific transfer request message is "for information only" and that the receiving NWDAF is not supposed to actually take over/transfer part of the subscription. The NWDAF may also use another query specifically created for the purpose of transferring the contextual information to another NWDAF (e.g. Nnwdaf_AnalyticsInfo_Notify)).

Step S911: NWDAF #3 may inform the analytics data consumer about a successful partial analytics subscription transfer using a Nnwdaf_AnalyticsSubscription_Notify message and may provide a new subscription correlation ID, it may assign in the Subscription Correlation Id parameter of this message and including a partial transfer flag. NWDAF #1 may continue to notify the analytics data consumer in Nnwdaf_AnalyticsSubscription_Notify messages using the original subscription correlation ID.

FIG. 10 is a flow chart illustrating a method for analytics data retrieval according to an embodiment, and implemented by a NRF (e.g., NRF 63, or CDS 23 (the NRF is a kind of CDS)). In step S1000, the NRF receives, from Network Data Analytics Functions (e.g., 60, 61, 62), NWDAFs, information representative of capability of the NWDAFs to provide analytics data (see, among others, steps S202 in FIG. 2A). The NRF may now register internally the capabilities received (see, among others, step S203 in FIG. 2A). In step S1001, the NRF receives, from an NWDAF analytics data consumer (e.g., 24 or 64), a query for analytics data, the query comprising query parameters specifying the analytics data to be retrieved (see, among others, step S204 in FIG. 2A). In step S1002 the NRF determines, based on the query parameters received from the NWDAF analytics data consumer and on the information representative of capability received from the at least one NWDAF (see, among others, step S205 in FIG. 2A): a selection of NWDAFs to be queried for analytics data, and per selected NWDAF a query parameter subset to be used for querying the selected NWDAF.

In step S1003, the NRF transmits, to the NWDAF analytics data consumer (see, among others, step S206 in FIG. 2A), an identification of the selected NWDAFs and per selected NWDAF the query parameter subset.

The NWDAF analytics data consumer may now issue requests/subscription requests (see, among others, step S207 in FIG. 2A) to each of the selected NWDAFs for retrieval of analytics data, using the query parameter subset received for querying the selected NWDAFs, and thus retrieve the desired analytics data (see, among others, step S208 in FIG. 2A).

Figure 11:
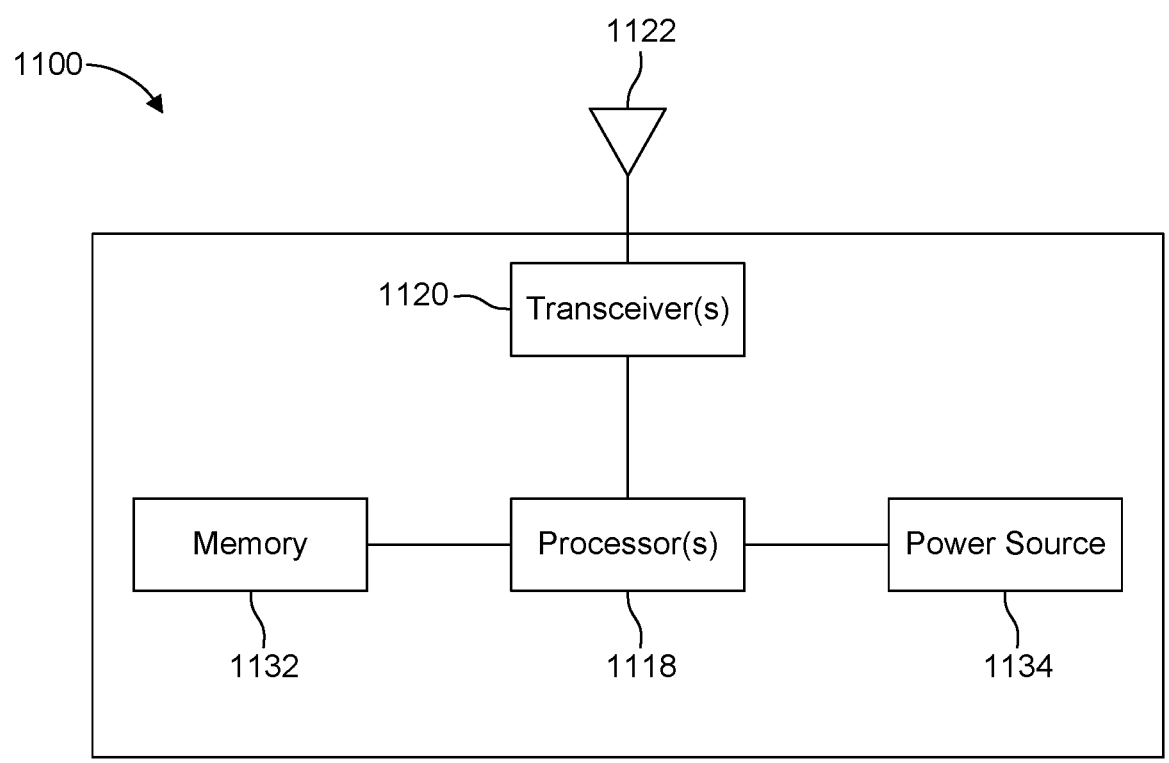
FIG. 11 is a system diagram illustrating an embodiment of a device for analytics data retrieval. The device corresponds, for example, to device 23 of FIGS. 2-5, or device 63 of FIGS. 6-8.

FIG. 11 is a system diagram illustrating an embodiment of a device 1100 for analytics data retrieval. The device corresponds, for example, to device 23 in FIGS. 2-5, or device 63 in FIGS. 6-8.

The device includes at least one processor 1118, a memory 1132, a power source 1134, and one or more transceivers 1120. A transmit/receive element 1122 may be configured to transmit signals to, or receive signals from, another device (e.g., analytics data consumer 24 or 64, or analytics function 20-22/NWDAF 60-62). For example, in one embodiment, the transmit/receive element 1122 may be an antenna configured to transmit and/or receive RF signals.

The at least one processor 1118 of device 1100 is configured to receive, from Network Data Analytics Functions (60, 61, 62), NWDAFs, information representative of capability of the NWDAFs to provide analytics data, receive, from an NWDAF analytics data consumer (64), a query for analytics data, the query comprising query parameters specifying the analytics data to be retrieved, determine, based on the query parameters received from the NWDAF analytics data consumer and on the information representative of capability received from the at least one NWDAF a selection of NWDAFs to be queried for analytics data and per selected NWDAF a query parameter subset to be used for querying the selected NWDAF, transmit, to the NWDAF analytics data consumer, an identification of the selected NWDAFs and per selected NWDAF the query parameter subset.

CONCLUSION

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU.

An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed"

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method performed by a first network analysis node in a network, the method comprising:
   receiving, from a device, a first message comprising information indicative of a request for a subscription, wherein the request for the subscription is for the device, to network analytics information, from the first network analysis node, and of a first list of further network analysis nodes selected for subscription by the device; and
   selecting a second network analysis node from among the further network analysis nodes of the first list of further network analysis nodes; and
   sending, to the second network analysis node, a second message comprising information indicative of a request for a transfer of at least part of the subscription to the network analytics information from the first network analysis node to the second network analysis node.

2. The method of claim 1, wherein the second message further comprises information indicative of the further network analysis nodes selected for subscription by the device.

3. The method of claim 1, further comprising sending, to the further network analysis nodes, a third message comprising information indicative of the transfer of the at least part of the subscription.

4. The method of claim 1, wherein the second message further comprises information indicative of at least one of an identifier of the device and an identifier of the subscription.

5. A first network analysis node, comprising:
   memory storing processor-executable program instructions; and at least one processor configured to execute the program instructions to:

receive, from a device in a network, a first message comprising information indicative of a request for a subscription, wherein the request for the subscription is for the device, to network analytics information, from the first network analysis node, and of a first list of further network analysis nodes selected for subscription by the device; and select a second network analysis node from among the further network analysis nodes of the first list of further network analysis nodes; and send, to the second network analysis node in the network, a second message comprising information indicative of a request for a transfer of at least part of the subscription to the network analytics information from the first network analysis node to the second network analysis node.

6. The first network analysis node of claim 5, wherein the second message further comprises information indicative of the further network analysis nodes selected for subscription by the device.

7. The first network analysis node of claim 5, wherein the at least one processor is further configured to execute the program instructions to send, to the further network analysis nodes, a third message comprising information indicative of the transfer of the at least part of the subscription.

8. The first network analysis node of claim 5 any one of the previous claims, wherein the second message further comprises information indicative of at least one of an identifier of the device and an identifier of the subscription.

* * * * *